United States Patent
Guo et al.

(10) Patent No.: US 11,897,808 B2
(45) Date of Patent: Feb. 13, 2024

(54) TUNABLE GLASS COMPOSITIONS HAVING IMPROVED MECHANICAL DURABILITY

(71) Applicant: Corning Incorporated, Corning, NY (US)

(72) Inventors: Xiaoju Guo, Pittsford, NY (US); Peter Joseph Lezzi, Corning, NY (US); Jian Luo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 56 days.

(21) Appl. No.: 17/412,502

(22) Filed: Aug. 26, 2021

(65) Prior Publication Data
US 2022/0064055 A1 Mar. 3, 2022

Related U.S. Application Data

(60) Provisional application No. 63/070,462, filed on Aug. 26, 2020.

(51) Int. Cl.
*C03C 3/091* (2006.01)
*C03C 10/00* (2006.01)
(Continued)

(52) U.S. Cl.
CPC ............ *C03C 10/0054* (2013.01); *C03C 4/02* (2013.01); *C03C 10/0027* (2013.01); *C03C 21/002* (2013.01); *C03C 2204/04* (2013.01)

(58) Field of Classification Search
CPC ................................. C03C 3/091; C03C 3/093
See application file for complete search history.

(56) References Cited

U.S. PATENT DOCUMENTS

| 1,901,574 A | 3/1933 | Kolb et al. |
|---|---|---|
| 2,394,781 A | 2/1946 | Jeffords et al. |

(Continued)

FOREIGN PATENT DOCUMENTS

| DE | 112017007131 T5 | 11/2019 |
|---|---|---|
| JP | 2000-063144 A | 2/2000 |

(Continued)

OTHER PUBLICATIONS

International Search Report and Written Opinion of the International Searching Authority; PCT/US2021/060755; dated Feb. 2, 2022; pp. 11; International Searching Authority.

(Continued)

*Primary Examiner* — Karl E Group
(74) *Attorney, Agent, or Firm* — Jeffrey A. Schmidt

(57) ABSTRACT

A glass composition includes: greater than or equal to 24 mol % and less than or equal to 60 mol % $SiO_2$; greater than or equal to 23 mol % and less than or equal to 35 mol % $Al_2O_3$; greater than or equal to 3.5 mol % and less than or equal to 35 mol % $B_2O_3$; greater than 0 mol % and less than or equal to 20 mol % $Li_2O$; greater than or equal to 0 mol % and less than or equal to 10 mol % $Na_2O$; and greater than or equal to 0 mol % and less than or equal to 3 mol % $K_2O$. The sum of $Li_2O$, $Na_2O$, and $K_2O$ (i.e., $R_2O$) in the glass composition may be greater than or equal to 12 mol % and less than or equal to 20 mol %.

20 Claims, 7 Drawing Sheets

(51) Int. Cl.
 *C03C 4/02* (2006.01)
 *C03C 21/00* (2006.01)

(56) References Cited

U.S. PATENT DOCUMENTS

| | | | |
|---|---|---|---|
| 3,464,880 | A | 9/1969 | Rinehart |
| 3,513,004 | A | 5/1970 | Kohut et al. |
| 3,615,769 | A | 10/1971 | Leitz et al. |
| 3,642,504 | A | 2/1972 | Petzold et al. |
| 3,656,923 | A | 4/1972 | Garfinkel et al. |
| 5,468,694 | A | 11/1995 | Taguchi et al. |
| 6,306,786 | B1 | 10/2001 | Koyama et al. |
| 6,340,647 | B1 | 1/2002 | Koyama et al. |
| 6,451,720 | B1 | 9/2002 | Kishimoto et al. |
| 7,659,222 | B2 | 2/2010 | Shimizu |
| 8,854,623 | B2 | 10/2014 | Fontaine et al. |
| 10,427,972 | B2 | 10/2019 | Luo et al. |
| 10,501,364 | B2 | 12/2019 | Bookbinder et al. |
| 11,078,105 | B2 | 8/2021 | Luo et al. |
| 2013/0210962 | A1 | 8/2013 | Hofmann et al. |
| 2014/0141226 | A1 | 5/2014 | Bookbinder et al. |
| 2014/0364298 | A1 | 12/2014 | Ohara et al. |
| 2015/0140299 | A1 | 5/2015 | Ellison et al. |
| 2016/0102011 | A1 | 4/2016 | Hu et al. |
| 2016/0102014 | A1 | 4/2016 | Hu et al. |
| 2016/0326045 | A1 | 11/2016 | Li |
| 2019/0300422 | A1* | 10/2019 | Guo ............... G02F 1/133308 |
| 2019/0382302 | A1* | 12/2019 | Xue ................. C03C 21/002 |
| 2020/0131086 | A1* | 4/2020 | Koike ............... C03C 21/002 |

FOREIGN PATENT DOCUMENTS

| | | | |
|---|---|---|---|
| JP | 2000-159540 A | 6/2000 | |
| JP | 2002-047030 A | 2/2002 | |
| JP | 2003-192386 A | 7/2003 | |
| WO | 2018/017638 A1 | 1/2018 | |
| WO | 2018/199046 A1 | 11/2018 | |
| WO | WO-2018199046 A1 * | 11/2018 | ............. C03C 21/00 |
| WO | 2020/121888 A1 | 6/2020 | |
| WO | WO-2020121889 A1 * | 6/2020 | ........... C03C 21/002 |

OTHER PUBLICATIONS

International Search Report and Written Opinion of the International Searching Authority; PCT/US2021/047057; dated Jan. 5, 2022; 11 pages; European Patent Office.
"Standard Test Method for Young's Modulus, Shear Modulus, and Poisson's Ratio for Glass and Glass-Ceramics by Resonance", In Astm C623-21, 2021, 7 pages.
ASTM C1351M-96(2017) "Standard Test Method for Measurement of Viscosity of Glass Between 104 Pas and 108 Pas by Viscous Compression of a Solid Right Cylinder".
ASTM C598-93(2013), titled "Standard Test for Annealing Point and Strain Point of Glass by Beam Bending.".
ASTM C829-81 (2015), titled "Standard Practice for Measurement of Liquidus Temperature of Glass by the Gradient Furnace Method".
ASTM E1967-"Standard Test Method for the Automated Determination of Refractive Index of Glass Samples Using the Oil Immersion Method and a Phase Contrast Microscope".
ASTM standard C770-16, entitled "Standard Test Method for Measurement of Glass Stress-Optical Coefficient,".
Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, Oct. 1992, pp. 1-30.
Darwent, "Bond dissociation energies in simple molecules", U.S. Department of Commerce: National Bureau of Standards, 1970, pp. 1-60.
Demetriou, M. D. et al., "A damage-tolerant glass", Nature Materials, vol. 10, 2011, pp. 123-128.
Kistler, S. S., "Stresses in Glass Produced by Nonuniform Exchange of Monovalent Ions," Journal of the American Ceramic Society, vol. 45, No. 2, Feb. 1962, pp. 59-68.
Lewandowski, J. J., et al., "Intrinsic plasticity or brittleness of metallic glasses", Philos. Mag. Lett. vol. 85, 2005, pp. 77-87, doi:10.1080/09500830500080474 (2005).
Mauro, J. C., "Grand Challenges in Glass Science", Frontiers in Materials, vol. 1, 2014, doi: 10.3389/fmats.2014.00020 (2014).
Mauro, J. C., et al., "M. S. Glass Science in the United States: Current Status and Future Directions", International Journal of Applied Glass Science, vol. 5, 2014, pp. 2-15, doi:10.1111/ijag.12058 (2014).
Pan et al.; "Thermal, Mechanical, and Upconversion Properties of Er3+/Yb3+ Co-Doped Titanate Glass Prepared by Levitation Method"; Journal of Alloys and Compounds 509, 7504-7507, doi:10.1016/j.jallcom.2011.04.104 (2011).
Poon, S. J., et al., "Poisson's Ratio and Intrinsic Plasticity of Metallic Glasses", Appl. Phys. Lett., vol. 92, 2008, 261902, doi:10.1063/1.2952827.
Reddy, K. P. R. et al., "Fracture Toughness Measurement of Glass and Ceramic Materials Using Chevron-Notched Specimens," J. Am. Ceram. Soc., vol. 71, No. 6, 1988, pp. C-310-C-313.
Rice, J. R. & Thomson, R. Ductile versus brittle behaviour of crystals. Philos. Mag. 29, 73-97, doi: 10.1080/14786437408213555 (1974).
Ritchie, R. O., "The conflicts between strength and toughness", Nature Materials, vol. 10, 2011, pp. 817-822, doi: 10.1038/nmat3115.
Schroers, J. et al., "Ductile Bulk Metallic Glass", Phys. Rev. Lett. 93, doi:10.1103/PhysRevLett.93.255506 (2004).
Sellappan, P. et al., "Composition dependence of indentation deformation and indentation cracking in glass", Acta Mater., vol. 61, 2013, pp. 5949-5965, doi:10.1016/j.actamat.2013.06.034 (2013).
Shi, Y., et al., "Intrinsic ductility of glassy solids", J. Appl. Phys., vol. 115, 043528, doi:10.1063/1.4862959 (2014).
Tarafder, A. et al., "Nanostructuring and fluorescence properties of Eu3+:LiTaO3 in Li2O—Ta2O5—SiO2—Al2O3 glass-ceramics", JMatS, vol. 44, 2009, pp. 4495-4498, doi:10.1007/s10853-009-3659-5 (2009).
Wondraczek, L. et al. Towards Ultrastrong Glasses. Adv. Mater. 23, 4578-4586, doi:10.1002/adma.201102795 (2011).
Xu, J. & Ma, E. Damage-tolerant Zr—Cu—Al-based bulk metallic glasses with record-breaking fracture toughness. J. Mater. Res. 29, 1489-1499, doi: 10.1557/jmr.2014.160 (2014).
Zhang et al., "A novel upconversion TiO2—La2O3—Ta2O5 bulk glass co-doped with Er3+/Yb3+ fabricated by containerless processing". Materials Letters, vol. 66, pp. 367-369.

\* cited by examiner

TUNABLE GLASS COMPOSITIONS HAVING IMPROVED MECHANICAL DURABILITY

CROSS-REFERENCE TO RELATED APPLICATION

This application claims the benefit of priority under 35 U.S.C. § 119 of U.S. Provisional Application Ser. No. 63/070,462 filed on Aug. 26, 2020, the content of which is relied upon and incorporated herein by reference in its entirety.

FIELD

The present specification generally relates to ion-exchangeable glass compositions and, in particular, to ion-exchangeable glass compositions capable of providing transparent, translucent, or opaque, colored glass articles having an improved mechanical durability.

TECHNICAL BACKGROUND

Glass articles, such as cover glasses, glass backplanes, and the like, are employed in both consumer and commercial electronic devices such as LCD and LED displays, computer monitors, automated teller machines (ATMs), and the like. Some of these glass articles may include "touch" functionality which necessitates that the glass article be contacted by various objects including a user's fingers and/or stylus devices and, as such, the glass must be sufficiently robust to endure regular contact without damage, such as scratching. Indeed, scratches introduced into the surface of the glass article may reduce the strength of the glass article as the scratches may serve as initiation points for cracks leading to catastrophic failure of the glass.

Moreover, it may be desirable to color at least a portion of a glass article. For example, manufactures may desire to use the glass article on the back of an electronic device (e.g., a phone) or as a countertop.

Accordingly, a need exists for alternative glasses which have improved mechanical properties while also being tunable to produce transparent, translucent, or opaque, colored glass articles.

SUMMARY

According to a first aspect A1, a glass composition may comprise: greater than or equal to 24 mol % and less than or equal to 60 mol % $SiO_2$; greater than or equal to 23 mol % and less than or equal to 35 mol % $Al_2O_3$; greater than or equal to 3.5 mol % and less than or equal to 35 mol % $B_2O_3$; greater than 0 mol % and less than or equal to 20 mol % $Li_2O$; greater than or equal to 0 mol % and less than or equal to 10 mol % $Na_2O$; and greater than or equal to 0 mol % and less than or equal to 3 mol % $K_2O$, wherein $R_2O$ is greater than or equal to 12 mol % and less than or equal to 20 mol %, $R_2O$ being the sum of $Li_2O$, $Na_2O$, and $K_2O$.

A second aspect A2 includes the glass composition according to the first aspect A1, wherein $Al_2O_3+B_2O_3$ is greater than or equal to 28 mol % and less than or equal to 60 mol %.

A third aspect A3 includes the glass composition according to the first aspect A1 or A2, wherein the glass composition comprises greater than or equal to 24 mol % and less than or equal to 34 mol % $Al_2O_3$.

A fourth aspect A4 includes the glass composition according to any one of aspects A1-A3, wherein the glass composition comprises greater than or equal to 5 mol % and less than or equal to 30 mol % $B_2O_3$.

A fifth aspect A5 includes the glass composition according to any one of aspects A1-A4, wherein $Al_2O_3$—$R_2O$—RO is greater than or equal to −0.5 mol %.

A sixth aspect A6 includes the glass composition according to any one of aspects A1-A5, wherein the glass composition comprises greater than or equal to 3 mol % and less than or equal to 18 mol % $Li_2O$.

A seventh aspect A7 includes the glass composition according to the sixth aspect A6, wherein the glass composition comprises greater than or equal to 3 mol % and less than or equal to 11 mol % $Li_2O$.

An eighth aspect A8 includes the glass composition according to the sixth aspect A6, wherein the glass composition comprises greater than or equal to 10 mol % and less than or equal to 18 mol % $Li_2O$.

An ninth aspect A9 includes the glass composition according to the sixth aspect A6, wherein the glass composition comprises: greater than or equal to 25 mol % and less than or equal to 35 mol % $Al_2O_3$; and greater than or equal to 3 mol % and less than or equal to 11 mol % $Li_2O$.

A tenth aspect A10 includes the glass composition according to the sixth aspect A6, wherein the glass composition comprises: greater than or equal to 24 mol % and less than or equal to 30 mol % $Al_2O_3$; and greater than or equal to 10 mol % and less than or equal to 18 mol % $Li_2O$.

An eleventh aspect A11 includes the glass composition according to any one of aspects A1-A10, wherein $R_2O$ is greater than or equal to 12.5 mol % and less than or equal to 19 mol %.

A twelfth aspect A12 includes the glass composition according to any one of aspects A1-A11, wherein RO is greater than or equal to 0 mol % and less than or equal to 17.5 mol %, RO being the sum of MgO, CaO, SrO, BaO, and ZnO.

A thirteenth aspect A13 includes the glass composition according to the twelfth aspect A12, wherein RO is greater than 0 mol % and less than or equal to 15 mol %.

A fourteenth aspect A14 includes the glass composition according to any one of aspects A1-A13, wherein the glass composition comprises greater than or equal to 0 mol % and less than or equal to 15 mol % MgO.

A fifteenth aspect A15 includes the glass composition according to any one of aspects A1-A14, wherein $Al_2O_3+B_2O_3$-$R_2O$—RO is greater than 2 mol %.

A sixteenth aspect A16 includes the glass composition according to any one of aspects A1-A15, wherein the glass composition has a $K_{Ic}$ fracture toughness as measured by a chevron notch short bar method greater than or equal to 0.75 MPa·m$^{1/2}$.

A seventeenth aspect A17 includes the glass composition according to any one of aspects A1-A16, wherein the glass composition has a Young's modulus greater than or equal to 70 MPa.

A eighteenth aspect A18 includes the glass composition according to any one of aspects A1-A17, wherein a ratio of $K_{Ic}$ fracture toughness to Young's modulus of the glass composition is greater than or equal to 0.0095 m$^{1/2}$.

A nineteenth aspect A19 includes the glass composition according to the eighteenth aspect A18, wherein the ratio of $K_{Ic}$ fracture toughness to Young's modulus of the glass composition is greater than or equal to 0.01 m$^{1/2}$.

A twentieth aspect A20 includes the glass composition according to any one of aspects A1-A19, wherein the glass composition has a Poisson's ratio greater than or equal to 0.21.

Additional features and advantages of the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
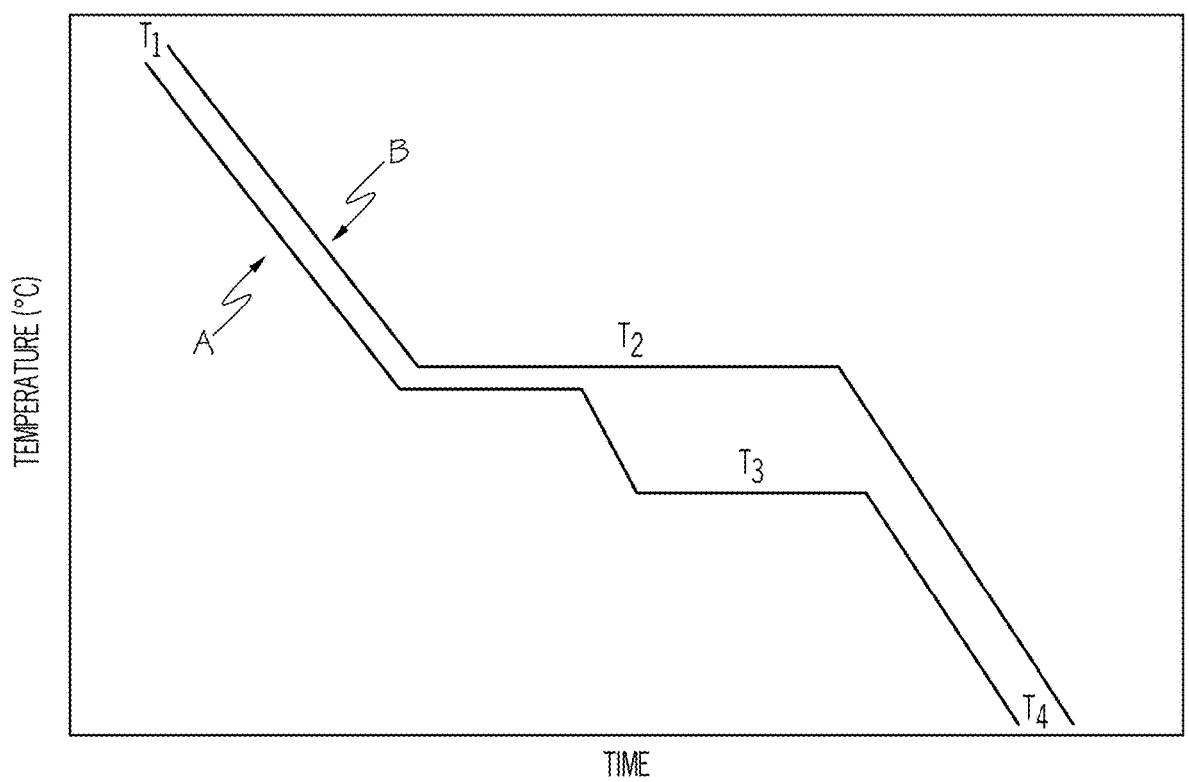
FIG. 1 is a plot of temperature vs. time (x-axis: Time; y-axis: Temperature) of exemplary cooling schedules to form a multi-phase glass according to one or more embodiments described herein.

Reference will now be made in detail to various embodiments of tunable glass compositions having improved mechanical durability. According to embodiments, a glass composition includes: greater than or equal to 24 mol % and less than or equal to 60 mol % $SiO_2$; greater than or equal to 23 mol % and less than or equal to 35 mol % $Al_2O_3$; greater than or equal to 3.5 mol % and less than or equal to 35 mol % $B_2O_3$; greater than 0 mol % and less than or equal to 20 mol % $Li_2O$; greater than or equal to 0 mol % and less than or equal to 10 mol % $Na_2O$; and greater than or equal to 0 mol % and less than or equal to 3 mol % $K_2O$. The sum of $Li_2O$, $Na_2O$, and $K_2O$ (i.e., $R_2O$) in the glass composition may be greater than or equal to 12 mol % and less than or equal to 20 mol %. Various embodiments of tunable glass compositions and methods of making transparent, translucent, or colored glass articles will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components (e.g., $SiO_2$, $Al_2O_3$, and the like) are specified in mole percent (mol %) on an oxide basis, unless otherwise specified.

The terms "0 mol %" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.1 mol %.

The term "fracture toughness," as used herein, refers to the $K_{IC}$ value, and is measured by the chevron notched short bar method. The chevron notched short bar (CNSB) method is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

The term "tunable," as used herein to describe a glass composition, refers to the properties of the glass composition being adjustable. For example, the glass composition described herein may be subjected to various cooling schedules from a forming process temperature (i.e., a melt) to produce transparent or translucent glass articles or opaque, colored glass-ceramic articles.

X-ray diffraction (XRD) spectrum, as described herein, is measured with a D8 ENDEAVOR X-ray Diffraction system with a LYNXEYE XE-T detector manufactured by Bruker Corporation (Billerica, Mass.). The scanning time of the glass composition sample is set to 15 minutes.

Transmission data (i.e., total transmission), as described herein, is measured with a Lambda 950 UV/Vis Spectrophotometer manufactured by PerkinElmer Inc. (Waltham, Mass. USA). The Lambda 950 apparatus was fitted with a 150 mm integrating sphere. Data was collected using an open beam baseline and a Spectralon® reference reflectance disk. For total transmittance (Total Tx), the sample is fixed at the integrating sphere entry point. For diffuse transmittance (Diffuse Tx), the Spectralon® reference reflectance disk over the sphere exit port is removed to allow on-axis light to exit the sphere and enter a light trap. A zero offset measurement is made, with no sample, of the diffuse portion to determine efficiency of the light trap. To correct diffuse transmittance measurements, the zero offset contribution is subtracted from the sample measurement using the equation: Diffuse Tx=Diffuse$_{Measured}$−(Zero Offset*(Total Tx/100)). The percentage of reflectance (i.e., % Reflectance) is measured for all wavelengths as: (% Diffuse Tx/% Total Tx)*100.

The term "average transmission," as used herein, refers to the average of transmission made within a given wavelength range with each whole numbered wavelength weighted equally. In the embodiments described herein, the "average transmission" is reported over the wavelength range from 400 nm to 800 nm (inclusive of endpoints).

The term "transparent," when used to describe an article formed of a glass composition herein, means that the glass composition has an average transmission of greater than or equal to 75% when measured at normal incidence for light in a wavelength range from 400 nm to 800 nm (inclusive of endpoints) at an article thickness of 0.6 mm.

The term "translucent," when used to describe an article formed of a glass composition herein, means that the glass composition has an average transmission greater than or equal to 20% and less than 75% when measured at normal incidence for light in a wavelength range from 400 nm to 800 nm (inclusive of endpoints) at an article thickness of 0.6 mm.

The term "opaque," when used to describe an article formed of a glass composition herein, means that the glass composition has an average transmission less than 20% when measured at normal incidence for light in a wavelength range from 400 nm to 800 nm (inclusive of endpoints) at an article thickness of 0.6 mm.

The term "white," when used to describe an article formed of a glass composition herein, means the glass composition has a transmittance color coordinate in the CIELAB color space of: L* greater than or equal to 80; |a*| less than or equal to 2; and |b*| less than or equal to 3. The CIELAB color space is measured using standard illuminant D65.

The term "patterned," when used to describe an article formed of a glass composition herein, means the glass composition has a first transmittance color coordinate in the white CIELAB color space and a second transmittance color coordinate in a different CIELAB color space different than the white CIELAB color space.

The term "Vogel-Fulcher-Tamman ('VFT') relation," as used herein, describes the temperature dependence of the viscosity and is represented by the following equation:

$$\log \eta = A + \frac{B}{T - T_o}$$

where η is viscosity. To determine VFT A, VFT B, and VFT $T_o$, the viscosity of the glass composition is measured over a given temperature range. The raw data of viscosity versus temperature is then fit with the VFT equation by least-squares fitting to obtain A, B, and $T_o$. With these values, a viscosity point (e.g., 200 P Temperature, 35000 P Temperature, and 200000 P Temperature) at any temperature above softening point may be calculated.

The term "melting point," as used herein, refers to the temperature at which the viscosity of the glass composition is 200 poise as measured in accordance with ASTM C338.

The term "softening point," as used herein, refers to the temperature at which the viscosity of the glass composition is $1 \times 10^{7.6}$ poise. The softening point is measured according to the parallel plate viscosity method which measures the viscosity of inorganic glass from $10^7$ to $10^9$ poise as a function of temperature, similar to ASTM C1351M.

The term "annealing point" or "effective annealing temperature" as used herein, refers to the temperature at which the viscosity of the glass composition is $1 \times 10^{13.18}$ poise as measured in accordance with ASTM C598.

The term "strain point," as used herein, refers to the temperature at which the viscosity of the glass composition is $1 \times 10^{14.68}$ poise as measured in accordance with ASTM C598.

Density, as described herein, is measured by the buoyancy method of ASTM C693-93.

The term "CTE," as used herein, refers to the instantaneous coefficient of thermal expansion of the glass composition at 300° C. cooling (i.e., the instantaneous CTE at 300° C., measured while cooling) or at 50° C. cooling (i.e., the instantaneous CTE at 50° C., measured while cooling), as specified.

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify as determined with the gradient furnace method according to ASTM C829-81.

The elastic modulus (also referred to as Young's modulus) of the glass composition, as described herein, is provided in units of gigapascals (GPa) and is measured in accordance with ASTM C623.

The shear modulus of the glass composition, as described herein, is provided in units of gigapascals (GPa). The shear modulus of the glass composition is measured in accordance with ASTM C623.

Poisson's ratio, as described herein, is measured in accordance with ASTM C623.

Refractive index, as described herein, is measured in accordance with ASTM E1967.

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is measured with the FSM in conjunction with a scatter light polariscope (SCALP) technique known in the art. FSM measures the depth of compression for potassium ion exchange and SCALP measures the depth of compression for sodium ion exchange. The maximum central tension (CT) values are measured using a SCALP technique known in the art.

The phrase "depth of compression" (DOC), as used herein, refers to the position in the article where compressive stress transitions to tensile stress.

Chemical strengthening processes have been used to achieve high strength and high toughness in alkali silicate glasses. The frangibility limit of a chemically strengthened glass is generally controlled by the fracture toughness of the components of the glass. Silica has a relatively low $K_{Ic}$ fracture toughness of approximately 0.75 MPa·m$^{1/2}$, which constrains the $K_{Ic}$ fracture toughness of silicate glasses to be limited to values of about 0.75 MPa·m$^{1/2}$. Particular oxides may increase the fracture toughness (e.g., $ZrO_2$, $Ta_2O_5$, $TiO_2$, $HfO_2$, $La_2O_3$, $Y_2O_3$). However, such oxides may be expensive, thereby increasing the cost of glass articles formed from the glass composition.

The addition of $Al_2O_3$ may increase the fracture toughness of the glass composition, but may cause the liquidus viscosity to decrease, making the glass composition difficult to form. The addition of $B_2O_3$ may also improve fracture toughness of the glass composition. However, the presence $B_2O_3$ may reduce the achievable central tension of the glass composition following ion exchange strengthening of the glass composition and may lead to volatility issues during the melting and forming processes.

Disclosed herein are glass compositions which mitigate the aforementioned problems. Specifically, the glass compositions disclosed herein comprise a relatively high concentration of $Al_2O_3$, which results in tunable glass compositions that may be subjected to various cooling schedules to produce transparent or translucent glass articles or opaque, colored glass-ceramic articles having improved fracture toughness.

The glass compositions described herein may be described as aluminoborosilicate glass compositions and comprise $SiO_2$, $Al_2O_3$, and $B_2O_3$. The glass compositions described herein also include alkali oxides, such as $Li_2O$ and $Na_2O$, to enable the ion-exchangeability of the glass compositions.

$SiO_2$ is the primary glass former in the glass compositions described herein and may function to stabilize the network structure of the glass compositions. The concentration of $SiO_2$ in the glass compositions should be sufficiently high (e.g., greater than or equal to 24 mol %) to provide basic glass forming capability. The amount of $SiO_2$ may be limited (e.g., to less than or equal to 60 mol %) to control the melting point of the glass composition, as the melting temperature of pure $SiO_2$ or high $SiO_2$ glasses is undesirably high. Thus, limiting the concentration of $SiO_2$ may aid in improving the meltability and the formability of the glass composition.

Accordingly, in embodiments, the glass composition may comprise greater than or equal to 24 mol % and less than or equal to 60 mol % $SiO_2$. In embodiments, the concentration of $SiO_2$ in the glass composition may be greater than or equal to 24 mol %, greater than or equal to 28 mol %, or even greater than or equal to 32 mol %. In embodiments, the concentration of $SiO_2$ in the glass composition may be less than or equal to 60 mol %, less than or equal to 55 mol %, less than or equal to 50 mol %, or even less than or equal to 45 mol %. In embodiments, the concentration of $SiO_2$ in the glass composition may be greater than or equal to 24 mol % and less than or equal to 60 mol %, greater than or equal to 24 mol % and less than or equal to 55 mol %, greater than or equal to 24 mol % and less than or equal to 50 mol %, greater than or equal to 24 mol % and less than or equal to 45 mol %, greater than or equal to 28 mol % and less than or equal to 60 mol %, greater than or equal to 28 mol % and less than or equal to 55 mol %, greater than or equal to 28 mol % and less than or equal to 50 mol %, greater than or equal to 28 mol % and less than or equal to 45 mol %, greater than or equal to 32 mol % and less than or equal to 60 mol %, greater than or equal to 32 mol % and less than or equal to 55 mol %, greater than or equal to 32 mol % and less than or equal to 50 mol %, or even greater than or equal to 32 mol % and less than or equal to 45 mol %, or any and all sub-ranges formed from any of these endpoints.

Like $SiO_2$, $Al_2O_3$ may also stabilize the glass network and additionally provides improved mechanical properties and chemical durability to the glass composition. The amount of $Al_2O_3$ may also be tailored to the control the viscosity of the glass composition. The concentration of $Al_2O_3$ should be sufficiently high (e.g., greater than or equal to 23 mol %) such that the resultant glass composition has the desired fracture toughness (e.g., greater than or equal to 0.75 MPa·m$^{1/2}$). However, if the amount of $Al_2O_3$ is too high (e.g., greater than 35 mol %), the viscosity of the melt may increase, thereby diminishing the formability of the glass composition. In embodiments, the glass composition may comprise greater than or equal to 23 mol % and less than or equal to 35 mol % $Al_2O_3$. In embodiments, the glass composition may comprise greater than or equal to 24 mol % and less than or equal to 34 mol % $Al_2O_3$. In embodiments, the concentration of $Al_2O_3$ in the glass composition may be greater than or equal to 23 mol %, greater than or equal to 24 mol %, greater than or equal to 25 mol %, or even greater than or equal to 26 mol %. In embodiments, the concentration of $Al_2O_3$ in the glass composition may be less than or equal 35 mol %, less than or equal to 34 mol %, less than or equal to 32 mol %, or even less than or equal to 30 mol %. In embodiments, the concentration of $Al_2O_3$ in the glass composition may be greater than or equal 23 mol % and less than or equal to 35 mol %, greater than or equal to 23 mol % and less than or equal to 34 mol %, greater than or equal to 23 mol % and less than or equal to 32 mol %, greater than or equal to 23 mol % and less than or equal to 30 mol %, greater than or equal 24 mol % and less than or equal to 35 mol %, greater than or equal to 24 mol % and less than or equal to 34 mol %, greater than or equal to 24 mol % and less than or equal to 32 mol %, greater than or equal to 24 mol % and less than or equal to 30 mol %, greater than or equal 25 mol % and less than or equal to 35 mol %, greater than or equal to 25 mol % and less than or equal to 34 mol %, greater than or equal to 25 mol % and less than or equal to 32 mol %, greater than or equal to 25 mol % and less than or equal to 30 mol %, greater than or equal 26 mol % and less than or equal to 35 mol %, greater than or equal to 26 mol % and less than or equal to 34 mol %, greater than or equal to 26 mol % and less than or equal to 32 mol %, or even greater than or equal to 26 mol % and less than or equal to 30 mol %, or any and all sub-ranges formed from any of these endpoints.

$B_2O_3$ decreases the melting temperature of the glass composition. Furthermore, the addition of $B_2O_3$ in the glass composition helps achieve an interlocking crystal microstructure when the glass compositions are cerammed. In addition, $B_2O_3$ may also improve the damage resistance of the glass composition. When boron in the residual glass present after ceramming is not charge balanced by alkali oxides or divalent cation oxides (such as MgO, CaO, SrO, BaO, and ZnO), the boron will be in a trigonal-coordination state (or three-coordinated boron), which opens up the structure of the glass. The network around these three-coordinated boron atoms is not as rigid as tetrahedrally coordinated (or four-coordinated) boron. Without being bound by theory, it is believed that glass compositions that include three-coordinated boron can tolerate some degree of deformation before crack formation compared to four-coordinated boron. By tolerating some deformation, the Vickers indentation crack initiation threshold values increase. Fracture toughness of the glass compositions that include three-coordinated boron may also increase. The concentration of $B_2O_3$ should be sufficiently high (e.g., greater than or equal to 3.5 mol %) to improve the formability and increase the fracture toughness of the glass composition. However, if $B_2O_3$ is too high, the chemical durability and liquidus viscosity may diminish and volatilization and evaporation of $B_2O_3$ during melting becomes difficult to control. Therefore, the amount of $B_2O_3$ may be limited (e.g., less than or equal to 35 mol %) to maintain chemical durability and manufacturability of the glass composition.

In embodiments, the glass composition may comprise greater than or equal to 3.5 mol % and less than or equal to 35 mol % $B_2O_3$. In embodiments, the glass composition may comprise greater than or equal to 5 mol % and less than or equal to 30 mol % $B_2O_3$. In embodiments, the concentration of $B_2O_3$ in the glass composition may be greater than or equal to 3.5 mol %, greater than or equal to 5 mol %, greater than or equal to 7.5 mol %, greater than or equal to 10 mol %, greater than or equal to 12.5 mol %, greater than or equal to 15 mol %, or even greater than or equal to 17.5 mol %. In embodiments, the concentration of $B_2O_3$ in the glass composition may be less than or equal to 35 mol %, less than or equal to 30 mol %, less than or equal to 25 mol %, or even less than or equal to 20 mol %. In embodiments, the concentration of $B_2O_3$ in the glass composition may be greater than or equal to 3.5 mol % and less than or equal to 35 mol %, greater than or equal to 3.5 mol % and less than or equal to 30 mol %, greater than or equal to 3.5 mol % and less than or equal to 25 mol %, greater than or equal to 3.5 mol % and less than or equal to 20 mol %, greater than or equal to 5 mol % and less than or equal to 35 mol %, greater than or equal to 5 mol % and less than or equal to 30 mol %, greater than or equal to 5 mol % and less than or equal to 25 mol %, greater than or equal to 5 mol % and less than or equal to 20 mol %, greater than or equal to 7.5 mol % and less than or equal to 35 mol %, greater than or equal to 7.5 mol % and less than or equal to 30 mol %, greater than or equal to 7.5 mol % and less than or equal to 25 mol %, greater than or equal to 7.5 mol % and less than or equal to 20 mol %, greater than or equal to 10 mol % and less than or equal to 35 mol %, greater than or equal to 10 mol % and less than or equal to 30 mol %, greater than or equal to 10 mol % and less than or equal to 25 mol %, greater than or equal to 10 mol % and less than or equal to 20 mol %, greater than or equal to 12.5 mol % and less than or equal to 35 mol %, greater than or equal to 12.5 mol % and less than or equal to 30 mol %, greater than or equal to 12.5 mol % and less than or equal to 25 mol %, greater than or equal to 12.5 mol % and less than or equal to 20 mol %, greater than or equal to 15 mol % and less than or equal to 35 mol %, greater than or equal to 15 mol % and less than or equal to 30 mol %, greater than or equal to 15 mol % and less than or equal to 25 mol %, greater than or equal to 15 mol % and less than or equal to 20 mol %, greater than or equal to 17.5 mol % and less than or equal to 35 mol %, greater than or equal to 17.5 mol % and less than or equal to 30 mol %, greater than or equal to 17.5 mol % and less than or equal to 25 mol %, or even greater than or equal to 17.5 mol % and less than or equal to 20 mol %, or any and all sub-ranges formed from any of these endpoints.

The glass compositions described herein include a relatively high concentration of $Al_2O_3$ and $B_2O_3$, which may increase the fracture toughness of the glass compositions. In embodiments, the total amount of $Al_2O_3$ and $B_2O_3$ (i.e., $Al_2O_3$ (mol %)+$B_2O_3$ (mol %)) in the glass composition may be greater than or equal to 28 mol % to provide enhanced fracture toughness. The total amount of $Al_2O_3$ and $B_2O_3$ in the glass composition may be limited (e.g., less than or equal to 60 mol %) to control the liquidus temperature of the glass composition, as an increased total amount of $Al_2O_3$ and $B_2O_3$ may increase the liquidus temperature. An increased liquidus temperature decreases the liquidus viscosity and stability of the glass composition so that the glass composition may no longer be suitable for downdrawing or fusion forming processes.

In embodiments, the total amount of $Al_2O_3$ and $B_2O_3$ in the glass composition may be greater than or equal to 28 mol % and less than or equal to 60 mol %. In embodiments, the total amount of $Al_2O_3$ and $B_2O_3$ in the glass composition may be greater than or equal to 30 mol % and less than or equal to 57 mol %. In embodiments, the total amount of $Al_2O_3$ and $B_2O_3$ in the glass composition may be greater than or equal to 28 mol %, greater than or equal to 30 mol %, greater than or equal to 32 mol %, or even greater than or equal to 34 mol %. In embodiments, the total amount of $Al_2O_3$ and $B_2O_3$ in the glass composition may be less than or equal to 60 mol %, less than or equal to 57 mol %, less than or equal to 53 mol %, or even less than or equal to 50 mol %. In embodiments, the total amount of $Al_2O_3$ and $B_2O_3$ in the glass composition may be greater than or equal to 28 mol % and less than or equal to 60 mol %, greater than or equal to 28 mol % and less than or equal to 57 mol %, greater than or equal to 28 mol % and less than or equal to 55 mol %, greater than or equal to 28 mol % and less than or equal to 53 mol %, greater than or equal to 28 mol % and less than or equal to 50 mol %, greater than or equal to 30 mol % and less than or equal to 60 mol %, greater than or equal to 30 mol % and less than or equal to 57 mol %, greater than or equal to 30 mol % and less than or equal to 55 mol %, greater than or equal to 30 mol % and less than or equal to 53 mol %, greater than or equal to 30 mol % and less than or equal to 50 mol %, greater than or equal to 32 mol % and less than or equal to 60 mol %, greater than or equal to 32 mol % and less than or equal to 57 mol %, greater than or equal to 32 mol % and less than or equal to 55 mol %, greater than or equal to 32 mol % and less than or equal to 53 mol %, greater than or equal to 32 mol % and less than or equal to 50 mol %, greater than or equal to 34 mol % and less than or equal to 60 mol %, greater than or equal to 34 mol % and less than or equal to 57 mol %, greater than or equal to 34 mol % and less than or equal to 55 mol %, greater than or equal to 34 mol % and less than or equal to 53 mol %, or even greater than or equal to 34 mol % and less than or equal to 50 mol %, or any and all sub-ranges formed from any of these endpoints.

As described hereinabove, the glass compositions may contain alkali oxides, such as $Li_2O$ and $Na_2O$, to enable the ion-exchangeability of the glass compositions. $Li_2O$ aids in the ion exchangeability of the glass composition and also reduces the softening point of the glass composition thereby increasing the formability of the glass. In embodiments, the glass composition may comprise greater than 0 mol % and less than or equal to 20 mol % $Li_2O$. In embodiments, the glass composition may comprise greater than or equal to 3 mol % and less than or equal to 18 mol % $Li_2O$. In embodiments, the concentration of $Li_2O$ in the glass composition may be greater than 0 mol %, greater than or equal to 3 mol %, greater than or equal to 5 mol %, greater than or equal to 7 mol %, or even greater than or equal to 10 mol %. In embodiments, the concentration of $Li_2O$ in the glass composition may be less than or equal to 20 mol %, less than or equal to 18 mol %, less than or equal to 15 mol %, less than or equal to 13 mol %, or even less than or equal to 11 mol %. In embodiments, the concentration of $Li_2O$ in the glass composition may be greater than 0 mol % and less than or equal to 20 mol %, greater than 0 mol % and less than or equal to 18 mol %, greater than 0 mol % and less than or equal to 15 mol %, greater than 0 mol % and less than or equal to 13 mol %, greater than 0 mol % and less than or equal to 11 mol %, greater than or equal to 3 mol % and less than or equal to 20 mol %, greater than or equal to 3 mol % and less than or equal to 18 mol %, greater than or equal to 3 mol % and less than or equal to 15 mol %, greater than or equal to 3 mol % and less than or equal to 13 mol %, greater than or equal to 3 mol % and less than or equal to 11 mol %, greater than or equal to 5 mol % and less than or equal to 20 mol %, greater than or equal to 5 mol % and less than or equal to 18 mol %, greater than or equal to 5 mol % and less than or equal to 15 mol %, greater than or equal to 5 mol % and less than or equal to 13 mol %, greater than or equal to 5 mol % and less than or equal to 11 mol %, greater than or equal to 7 mol % and less than or equal to 20 mol %, greater than or equal to 7 mol % and less than or equal to 18 mol %, greater than or equal to 7 mol % and less than or equal to 15 mol %, greater than or equal to 7 mol % and less than or equal to 13 mol %, greater than or equal to 7 mol % and less than or equal to 11 mol %, greater than or equal to 10 mol % and less than or equal to 20 mol %, greater than or equal to 10 mol % and less than or equal to 18 mol %, greater than or equal to 10 mol % and less than or equal to 15 mol %, greater than or equal to 10 mol % and less than or equal to 13 mol %, or even greater than or equal to 10 mol % and less than or equal to 11 mol %, or any and all sub-ranges formed from any of these endpoints.

In embodiments, the amount of $Al_2O_3$ may be balanced with the amount of $Li_2O$. In particular, in embodiments, the amount of $Al_2O_3$ may be higher than the amount of $Li_2O$, resulting in aluminum in a penta-coordinated state (or five-coordinated aluminum), which improves the fracture toughness of the glass composition. For example, in embodiments, the glass composition may comprise a relatively high amount of $Al_2O_3$ (e.g., greater than or equal to 25 mol % and less than or equal to 35 mol %) and a relatively low amount of $Li_2O$ (e.g., greater than or equal to 3 mol % and less than or equal to 11 mol %). In embodiments, the glass composition may comprise a relatively low amount of $Al_2O_3$ (e.g., greater than or equal to 24 mol % and less than or equal to 30 mol %) and a relatively high amount of $Li_2O$ (e.g., greater than or equal to 10 mol % and less than or equal to 18 mol %).

In addition to aiding in ion exchangeability of the glass composition, $Na_2O$ decreases the melting point and improves formability of the glass composition. However, if too much $Na_2O$ is added to the glass composition, the melting point may be too low. As such, in embodiments, the concentration of $Li_2O$ present in the glass composition may be greater than the concentration of $Na_2O$ present in the glass composition. In embodiments, the glass composition may comprise greater than or equal to 0 mol % and less than or equal to 10 mol % $Na_2O$. In embodiments, the concentration of $Na_2O$ in the glass composition may be greater than or equal to 0 mol %, greater than or equal to 0.5 mol %, greater than or equal to 1 mol %, or even greater than or equal to 1.5 mol %. In embodiments, the concentration of $Na_2O$ in the glass composition may be less than or equal to 10 mol %, less than or equal to 9 mol %, less than or equal to 7 mol %, or even less than or equal to 5 mol %. In embodiments, the concentration of $Na_2O$ in the glass composition may be greater than or equal to 0 mol % and less than or equal to 10 mol %, greater than or equal to 0 mol % and less than or equal to 9 mol %, greater than or equal to 0 mol % and less than or equal to 7 mol %, greater than or equal to 0 mol % and less than or equal to 5 mol %, greater than or equal to 0.5 mol % and less than or equal to 10 mol %, greater than or equal to 0.5 mol % and less than or equal to 9 mol %, greater than or equal to 0.5 mol % and less than or equal to 7 mol %, greater than or equal to 0.5 mol % and less than or equal to 5 mol %, greater than or equal to 1 mol % and less than or equal to 10 mol %, greater than or equal to 1 mol % and less than or equal to 9 mol %, greater than or equal to 1 mol % and less than or equal to 7 mol %, greater than or equal to 1 mol % and less than or equal to 5 mol %, greater than or equal to 1.5 mol % and less than or equal to 10 mol %, greater than or equal to 1.5 mol % and less than or equal to 9 mol %, greater than or equal to 1.5 mol % and less than or equal to 7 mol %, or even greater than or equal to 1.5 mol % and less than or equal to 5 mol %, or any and all sub-ranges formed from any of these endpoints.

The glass compositions described herein may further comprise alkali metal oxides other than $Li_2O$ and $Na_2O$, such as $K_2O$. $K_2O$, when included, promotes ion exchange and may increase the depth of compression and decrease the melting point to improve the formability of the glass composition. However, adding too much $K_2O$ may cause the surface compressive stress and melting point to be too low. Accordingly, in embodiments, the amount of $K_2O$ added to the glass composition may be limited. In embodiments, the glass composition may comprise greater than or equal to 0 mol % and less than or equal to 3 mol % $K_2O$. In embodiments, the concentration of $K_2O$ in the glass composition may be greater than or equal to 0 mol % or even greater than or equal to 0.1 mol %. In embodiments, the concentration of $K_2O$ in the glass composition may be less than or equal to 3 mol %, less than or equal to 1 mol %, or even less than or equal to 0.5 mol %. In embodiments, the concentration of $K_2O$ in the glass composition may be greater than or equal to 0 mol % and less than or equal to 3 mol %, greater than or equal to 0 mol % and less than or equal to 1 mol %, greater than or equal to 0 mol % and less than or equal to 0.5 mol %, greater than or equal to 0.1 mol % and less than or equal to 3 mol %, greater than or equal to 0.1 mol % and less than or equal to 1 mol %, or even greater than or equal to 0.1 mol % and less than or equal to 0.5 mol %, or any and all sub-ranges formed from any of these endpoints.

The sum of all alkali oxides is expressed herein as $R_2O$. Specifically, $R_2O$ is the sum (in mol %) of $Li_2O$, $Na_2O$, and $K_2O$ present in the glass composition (i.e., $R_2O=Li_2O$ (mol %)+$Na_2O$ (mol %)+ and $K_2O$ (mol %). Like $B_2O_3$, the alkali oxides aid in decreasing the softening point and molding temperature of the glass composition, thereby offsetting the increase in the softening point and molding temperature of the glass composition due to higher amounts of $SiO_2$ in the glass composition, for example. The softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100 \times 10^{-7}/°$ C., which may be undesirable.

In embodiments, the concentration of $R_2O$ in the glass composition may be greater than or equal to 12 mol % and less than or equal to 20 mol %. In embodiments, the concentration of $R_2O$ in the glass composition may be greater than or equal to 12.5 mol % and less than or equal to 19 mol %. In embodiments, the concentration of $R_2O$ in the glass composition may be greater than or equal to 12 mol %, greater than or equal to 12.5 mol %, or even greater than or equal to 13 mol %. In embodiments, the concentration of $R_2O$ in the glass composition may be less than or equal to 20 mol %, less than or equal to 19 mol %, less than or equal to 17 mol %, or even less than or equal to 15 mol %. In embodiments, the concentration of $R_2O$ in the glass composition may be greater than or equal to 12 mol % and less than or equal to 20 mol %, greater than or equal to 12 mol % and less than or equal to 19 mol %, greater than or equal to 12 mol % and less than or equal to 17 mol %, greater than or equal to 12 mol % and less than or equal to 15 mol %, greater than or equal to 12.5 mol % and less than or equal to 20 mol %, greater than or equal to 12.5 mol % and less than or equal to 19 mol %, greater than or equal to 12.5 mol % and less than or equal to 17 mol %, greater than or equal to 12.5 mol % and less than or equal to 15 mol %, greater than or equal to 13 mol % and less than or equal to 20 mol %, greater than or equal to 13 mol % and less than or equal to 19 mol %, greater than or equal to 13 mol % and less than or equal to 17 mol %, or even greater than or equal to 13 mol % and less than or equal to 15 mol %, or any and all sub-ranges formed from any of these endpoints.

The glass compositions described herein may further comprise MgO. MgO lowers the viscosity of the glass compositions, which enhances the formability, the strain point, and the Young's modulus, and may improve the ion exchangeability. However, when too much MgO is added to the glass composition, the diffusivity of sodium and potassium ions in the glass composition decreases which, in turn, adversely impacts the ion exchange performance (i.e., the ability to ion-exchange) of the resultant glass. In embodiments, the glass composition may comprise greater than or equal to 0 mol % and less than or equal to 15 mol % MgO. In embodiments, the glass composition may comprise greater than or equal to 0 mol % and less than or equal to 13 mol % MgO. In embodiments, the concentration of MgO in the glass composition may be greater than or equal to 0 mol %, greater than or equal to 1 mol %, or even greater than or equal to 2 mol %. In embodiments, the concentration of MgO in the glass composition may be less than or equal to 15 mol %, less than or equal to 13 mol %, less than or equal to 10 mol %, less than or equal to 7 mol %, or even less than or equal to 5 mol %. In embodiments, the concentration of MgO in the glass composition may be greater than or equal to 0 mol % and less than or equal to 15 mol %, greater than or equal to 0 mol % and less than or equal to 13 mol %, greater than or equal to 0 mol % and less than or equal to 10 mol %, greater than or equal to 0 mol % and less than or equal to 7 mol %, greater than or equal to 0 mol % and less than or equal to 5 mol %, greater than or equal to 1 mol % and less than or equal to 15 mol %, greater than or equal to 1 mol % and less than or equal to 13 mol %, greater than or equal to 1 mol % and less than or equal to 10 mol %, greater than or equal to 1 mol % and less than or equal to 7 mol %, greater than or equal to 1 mol % and less than or equal to 5 mol %, greater than or equal to 2 mol % and less than or equal to 15 mol %, greater than or equal to 2 mol % and less than or equal to 13 mol %, greater than or equal to 2 mol % and less than or equal to 10 mol %, greater than or equal to 2 mol % and less than or equal to 7 mol %, or even greater than or equal to 2 mol % and less than or equal to 5 mol %, or any and all sub-ranges formed from any of these endpoints.

The glass compositions described herein may further comprise CaO. CaO lowers the viscosity of a glass composition, which enhances the formability, the strain point and the Young's modulus, and may improve the ion exchangeability. However, when too much CaO is added to the glass composition, the diffusivity of sodium and potassium ions in the glass composition decreases which, in turn, adversely impacts the ion exchange performance (i.e., the ability to ion-exchange) of the resultant glass. In embodiments, the glass composition may comprise greater than or equal to 0 mol % and less than or equal to 5 mol % CaO. In embodiments, the concentration of CaO in the glass composition may be greater than or equal to 0 mol %, greater than or equal to 0.1 mol %, greater than or equal to 0.5 mol %, or even greater than or equal to 1 mol %. In embodiments, the concentration of CaO in the glass composition may be less than or equal to 5 mol % or even less than or equal to 3 mol %. In embodiments, the concentration of CaO in the glass composition may be greater than or equal to 0 mol % and less than or equal to 5 mol %, greater than or equal to 0 mol % and less than or equal to 3 mol %, greater than or equal to 0.1 mol % and less than or equal to 5 mol %, greater than or equal to 0.1 mol % and less than or equal to 3 mol %, greater than or equal to 0.5 mol % and less than or equal to 5 mol %, greater than or equal to 0.5 mol % and less than or equal to 3 mol %, greater than or equal to 1 mol % and less than or equal to 5 mol %, or even greater than or equal to 1 mol % and less than or equal to 3 mol %, or any and all sub-ranges formed from any of these endpoints. In embodiments, the glass composition may be substantially free of CaO.

In embodiments, the glass composition may comprise greater than or equal to 0 mol % and less than or equal to 5 mol % SrO. In embodiments, the concentration of SrO in the glass composition may be greater than or equal to 0 mol %, greater than or equal to 0.1 mol %, greater than or equal to 0.5 mol %, or even greater than or equal to 1 mol %. In embodiments, the concentration of SrO in the glass composition may be less than or equal to 5 mol % or even less than or equal to 3 mol %. In embodiments, the concentration of SrO in the glass composition may be greater than or equal to 0 mol % and less than or equal to 5 mol %, greater than or equal to 0 mol % and less than or equal to 3 mol %, greater than or equal to 0.1 mol % and less than or equal to 5 mol %, greater than or equal to 0.1 mol % and less than or equal to 3 mol %, greater than or equal to 0.5 mol % and less than or equal to 5 mol %, greater than or equal to 0.5 mol % and less than or equal to 3 mol %, greater than or equal to 1 mol % and less than or equal to 5 mol %, or even greater than or equal to 1 mol % and less than or equal to 3 mol %, or any and all sub-ranges formed from any of these endpoints. In embodiments, the glass composition may be substantially free of SrO.

In embodiments, the glass composition may comprise greater than or equal to 0 mol % and less than or equal to 5 mol % BaO. In embodiments, the concentration of BaO in the glass composition may be greater than or equal to 0 mol %, greater than or equal to 0.1 mol %, greater than or equal to 0.5 mol %, or even greater than or equal to 1 mol %. In embodiments, the concentration of BaO in the glass composition may be less than or equal to 5 mol % or even less than or equal to 3 mol %. In embodiments, the concentration of BaO in the glass composition may be greater than or equal to 0 mol % and less than or equal to 5 mol %, greater than or equal to 0 mol % and less than or equal to 3 mol %, greater than or equal to 0.1 mol % and less than or equal to 5 mol %, greater than or equal to 0.1 mol % and less than or equal to 3 mol %, greater than or equal to 0.5 mol % and less than or equal to 5 mol %, greater than or equal to 0.5 mol % and less than or equal to 3 mol %, greater than or equal to 1 mol % and less than or equal to 5 mol %, or even greater than or equal to 1 mol % and less than or equal to 3 mol %, or any and all sub-ranges formed from any of these endpoints. In embodiments, the glass composition may be substantially free of BaO.

In embodiments, the glass composition may comprise greater than or equal to 0 mol % and less than or equal to 5 mol % ZnO. In embodiments, the concentration of ZnO in the glass composition may be greater than or equal to 0 mol %, greater than or equal to 0.1 mol %, greater than or equal to 0.5 mol %, or even greater than or equal to 1 mol %. In embodiments, the concentration of ZnO in the glass composition may be less than or equal to 5 mol % or even less than or equal to 3 mol %. In embodiments, the concentration of ZnO in the glass composition may be greater than or equal to 0 mol % and less than or equal to 5 mol %, greater than or equal to 0 mol % and less than or equal to 3 mol %, greater than or equal to 0.1 mol % and less than or equal to 5 mol %, greater than or equal to 0.1 mol % and less than or equal to 3 mol %, greater than or equal to 0.5 mol % and less than or equal to 5 mol %, greater than or equal to 0.5 mol % and less than or equal to 3 mol %, greater than or equal to 1 mol % and less than or equal to 5 mol %, or even greater than or equal to 1 mol % and less than or equal to 3 mol %, or any and all sub-ranges formed from any of these endpoints. In embodiments, the glass composition may be substantially free of ZnO.

The sum of all divalent cation oxides is expressed herein as RO. Specifically, RO is the sum (in mol %) of MgO, CaO, SrO, BaO, and ZnO (i.e. RO=MgO (mol %)+CaO (mol %)+SrO (mol %)+BaO (mol %)+ZnO (mol %)). The concentration of RO in the glass composition may be limited (e.g., to less than or equal to 17.5 mol %) to enable relatively fast ion exchange. In embodiments, the concentration of RO in the glass composition may be greater than or equal to 0 mol % and less than or equal to 17.5 mol %. In embodiments, the concentration of RO in the glass composition may be greater than 0 mol % and less than or equal to 15 mol %. In embodiments, the concentration of RO in the glass composition may be greater than or equal to 0 mol %, greater than 0 mol %, greater than or equal to 0.1 mol %, greater than or equal to 1 mol %, or even greater than or equal to 2 mol %. In embodiments, the concentration of RO in the glass composition may be less than or equal to 17.5 mol %, less than or equal to 15 mol %, less than or equal to 12.5 mol, less than or equal to 10 mol %, or even less than or equal to 7.5 mol %. In embodiments, the concentration of RO in the glass composition may be greater than or equal to 0 mol % and less than or equal to 17.5 mol %, greater than or equal to 0 mol % and less than or equal to 15 mol %, greater than or equal to 0 mol % and less than or equal to 12.5 mol %, greater than or equal to 0 mol % and less than or equal to 10 mol %, greater than or equal to 0 mol % and less than or equal to 7.5 mol %, greater than 0 mol % and less than or equal to 17.5 mol %, greater than 0 mol % and less than or equal to 15 mol %, greater than 0 mol % and less than or equal to 12.5 mol %, greater than 0 mol % and less than or equal to 10 mol %, greater than 0 mol % and less than or equal to 7.5 mol %, greater than or equal to 0.1 mol % and less than or equal to 17.5 mol %, greater than or equal to 0.1 mol % and less than or equal to 15 mol %, greater than or equal to 0.1 mol % and less than or equal to 12.5 mol %, greater than or equal to 0.1 mol % and less than or equal to 10 mol %, greater than or equal to 0.1 mol % and less than or equal to 7.5 mol %, greater than or equal to 1 mol % and less than or equal to 17.5 mol %, greater than or equal to 1 mol % and less than or equal to 15 mol %, greater than or equal to 1 mol % and less than or equal to 12.5 mol %, greater than or equal to 1 mol % and less than or equal to 10 mol %, greater than or equal to 1 mol % and less than or equal to 7.5 mol %, greater than or equal to 2 mol % and less than or equal to 17.5 mol %, greater than or equal to 2 mol % and less than or equal to 15 mol %, greater than or equal to 2 mol % and less than or equal to 12.5 mol %, greater than or equal to 2 mol % and less than or equal to 10 mol %, or even greater than or equal to 2 mol % and less than or equal to 7.5 mol %, or any and all sub-ranges formed from any of these endpoints.

The total amount of $R_2O$ and RO in the glass composition may be limited (i.e., less than or equal to 30 mol %) to prevent devitrification of the glass composition. In embodiments, the total amount of $R_2O$ and RO (i.e., $R_2O$ (mol %)+RO (mol %)) in the glass composition may be greater than or equal to 10 mol %, greater than or equal to 12 mol %, greater than or equal to 14 mol %, or even greater than or equal to 16 mol %. In embodiments, the total amount of $R_2O$ and RO in the glass composition may be less than or equal to 30 mol %, less than or equal to 25 mol %, or even less than or equal to 20 mol %. In embodiments, the total amount of $R_2O$ and RO in the glass composition may be greater than or equal to 10 mol % and less than or equal to 30 mol %, greater than or equal to 10 mol % and less than or equal to 25 mol %, greater than or equal to 10 mol % and less than or equal to 20 mol %, greater than or equal to 12 mol % and less than or equal to 30 mol %, greater than or equal to 12 mol % and less than or equal to 25 mol %, greater than or equal to 12 mol % and less than or equal to 20 mol %, greater than or equal to 14 mol % and less than or equal to 30 mol %, greater than or equal to 14 mol % and less than or equal to 25 mol %, greater than or equal to 14 mol % and less than or equal to 20 mol %, greater than or equal to 16 mol % and less than or equal to 30 mol %, greater than or equal to 16 mol % and less than or equal to 25 mol %, or even greater than or equal to 16 mol % and less than or equal to 20 mol %, or any and all sub-ranges formed from any of these endpoints.

In embodiments, the glass composition is peraluminous (i.e., the amount of $Al_2O_3$ in the glass composition is greater than the sum of $R_2O$ and RO), which may increase the fracture toughness of the glass composition such that the glass compositions are more resistant to damage and/or failure. In embodiments, the amount of $Al_2O_3$ minus the sum of $R_2O$ and RO (i.e., $Al_2O_3$ (mol %)-$R_2O$ (mol %)-RO (mol %)) in the glass composition may be greater than or equal to −0.5 mol %. In embodiments, $Al_2O_3$—$R_2O$—RO in the glass composition may be greater than or equal to 0 mol % and less than or equal to 20 mol %. In embodiments, $Al_2O_3$—$R_2O$—RO in the glass composition may be greater than or equal to −0.5 mol %, greater than or equal to 0 mol %, greater than or equal to 0.1 mol %, greater than or equal to 1 mol %, or even greater than or equal to 2 mol %. In embodiments, $Al_2O_3$—$R_2O$—RO in the glass composition may be less than or equal to 20 mol %, less than or equal to 18 mol %, less than or equal to 16 mol %, or even less than or equal to 14 mol %. In embodiments, $Al_2O_3$—$R_2O$—RO in the glass composition may be greater than or equal to −0.5 mol % and less than or equal to 20 mol %, greater than or equal to −0.5 mol % and less than or equal to 18 mol %, greater than or equal to −0.5 mol % and less than or equal to 16 mol %, greater than or equal to −0.5 mol % and less than or equal to 14 mol %, greater than or equal to 0 mol % and less than or equal to 20 mol %, greater than or equal to 0 mol % and less than or equal to 18 mol %, greater than or equal to 0 mol % and less than or equal to 16 mol %, greater than or equal to 0 mol % and less than or equal to 14 mol %, greater than or equal to 0.1 mol % and less than or equal to 20 mol %, greater than or equal to 0.1 mol % and less than or equal to 18 mol %, greater than or equal to 0.1 mol % and less than or equal to 16 mol %, greater than or equal to 0.1 mol % and less than or equal to 14 mol %, greater than or equal to 1 mol % and less than or equal to 20 mol %, greater than or equal to 1 mol % and less than or equal to 18 mol %, greater than or equal to 1 mol % and less than or equal to 16 mol %, greater than or equal to 1 mol % and less than or equal to 14 mol %, greater than or equal to 2 mol % and less than or equal to 20 mol %, greater than or equal to 2 mol % and less than or equal to 18 mol %, greater than or equal to 2 mol % and less than or equal to 16 mol %, or even greater than or equal to 2 mol % and less than or equal to 14 mol %, or any and all sub-ranges formed from any of these endpoints.

In embodiments, the sum of $Al_2O_3$ and $B_2O_3$ in the glass composition is greater than the sum of $R_2O$ and RO which may increase the fracture toughness of the glass composition such that the glass compositions are more resistant to damage and/or failure. In embodiments, the sum of $Al_2O_3$ and $B_2O_3$ minus the sum of $R_2O$ and RO (i.e., $Al_2O_3$ (mol %)+$B_2O_3$ (mol %)-$R_2O$ (mol %)—RO (mol %)) in the glass composition may be greater than or equal to 2 mol %. In embodiments, $Al_2O_3$+$B_2O_3$—$R_2O$—RO in the glass composition may be greater than or equal to 4 mol %. In embodiments, $Al_2O_3$+$B_2O_3$-$R_2O$—RO in the glass composition may be greater than or equal to 2 mol %, greater than or equal to 4 mol %, or even greater than or equal to 6 mol %. In embodiments, $Al_2O_3$+$B_2O_3$—$R_2O$—RO in the glass composition may be less than or equal to 45 mol %, less than or equal to 40 mol %, less than or equal to 35 mol %, or even less than or equal to 30 mol %. In embodiments, $Al_2O_3$+$B_2O_3$—$R_2O$—RO in the glass composition may be greater than or equal to 2 mol % and less than or equal to 45 mol %, greater than or equal to 2 mol % and less than or equal to 40 mol %, greater than or equal to 2 mol % and less than or equal to 35 mol %, greater than or equal to 2 mol % and less than or equal to 30 mol %, greater than or equal to 4 mol % and less than or equal to 45 mol %, greater than or equal to 4 mol % and less than or equal to 40 mol %, greater than or equal to 4 mol % and less than or equal to 35 mol %, greater than or equal to 4 mol % and less than or equal to 30 mol %, greater than or equal to 6 mol % and less than or equal to 45 mol %, greater than or equal to 6 mol % and less than or equal to 40 mol %, greater than or equal to 6 mol % and less than or equal to 35 mol %, or even greater than or equal to 6 mol % and less than or equal to 30 mol %, or any and all sub-ranges formed from any of these endpoints.

In embodiments, the glass compositions described herein may further include one or more fining agents. In embodiments, the fining agents may include, for example, $SnO_2$. In embodiments, the concentration of $SnO_2$ in the glass composition may be greater than or equal to 0 mol %. In embodiments, the concentration of $SnO_2$ in the glass composition may be less than or equal to 1 mol %, less than or equal to 0.5 mol %, less than or equal to 0.4 mol %, less than or equal to 0.3 mol %, less than or equal to 0.2 mol %, or even less than or equal to 0.1 mol %. In embodiments, the concentration of $SnO_2$ in the glass composition may be greater than or equal to 0 mol % and less than or equal to 1 mol %, greater than or equal to 0 mol % and less than or equal to 0.5 mol %, greater than or equal to 0 mol % and less than or equal to 0.4 mol %, greater than or equal to 0 mol % and less than or equal to 0.3 mol %, greater than or equal to 0 mol % and less than or equal to 0.2 mol %, or even greater than or equal to 0 mol % and less than or equal to 0.1 mol %, or any and all sub-ranges formed from any of these endpoints. In embodiments, the glass composition may be substantially free of $SnO_2$.

In embodiments, the glass compositions described herein may further include tramp materials such as FeO, $Fe_2O_3$, MnO, $MoO_3$, $La_2O_3$, CdO, $As_2O_3$, $Sb_2O_3$, sulfur-based compounds, such as sulfates, halogens, or combinations thereof.

In embodiments, the glass composition may comprise: greater than or equal to 24 mol % and less than or equal to 60 mol % $SiO_2$; greater than or equal to 23 mol % and less than or equal to 35 mol % $Al_2O_3$; greater than or equal to 3.5 mol % and less than or equal to 35 mol % $B_2O_3$; greater than 0 mol % and less than or equal to 20 mol % $Li_2O$; greater than or equal to 0 mol % and less than or equal to 10 mol % $Na_2O$; and greater than or equal to 0 mol % and less than or equal to 3 mol % $K_2O$, wherein $R_2O$ is greater than or equal to 12 mol % and less than or equal to 20 mol %, $R_2O$ being the sum of $Li_2O$, $Na_2O$, and $K_2O$.

The articles formed from the glass compositions described herein may be any suitable shape or thickness, which may vary depending on the particular application for use of the glass composition. Glass sheet embodiments may have a thickness greater than or equal to 30 μm, greater than or equal to 50 μm, greater than or equal to 100 μm, greater than or equal to 250 μm, greater than or equal to 500 μm, greater than or equal to 750 μm, or even greater than or equal to 1 mm. In embodiments, the glass sheet embodiments may have a thickness less than or equal to 6 mm, less than or equal to 5 mm, less than or equal to 4 mm, less than or equal to 3 mm, or even less than or equal to 2 mm. In embodiments, the glass sheet embodiments may have a thickness greater than or equal to 30 μm and less than or equal to 6 mm, greater than or equal to 30 μm and less than or equal to 5 mm, greater than or equal to 30 μm and less than or equal to 4 mm, greater than or equal to 30 μm and less than or equal to 3 mm, greater than or equal to 30 μm and less than or equal to 2 mm, greater than or equal to 50 μm and less than or equal to 6 mm, greater than or equal to 50 μm and less than or equal to 5 mm, greater than or equal to 50 μm and less than or equal to 4 mm, greater than or equal to 50 μm and less than or equal to 3 mm, greater than or equal to 50 μm and less than or equal to 2 mm, greater than or equal to 100 μm and less than or equal to 6 mm, greater than or equal to 100 μm and less than or equal to 5 mm, greater than or equal to 100 μm and less than or equal to 4 mm, greater than or equal to 100 μm and less than or equal to 3 mm, greater than or equal to 100 μm and less than or equal to 2 mm, greater than or equal to 250 μm and less than or equal to 6 mm, greater than or equal to 250 μm and less than or equal to 5 mm, greater than or equal to 250 μm and less than or equal to 4 mm, greater than or equal to 250 μm and less than or equal to 3 mm, greater than or equal to 250 μm and less than or equal to 2 mm, greater than or equal to 500 μm and less than or equal to 6 mm, greater than or equal to 500 μm and less than or equal to 5 mm, greater than or equal to 500 μm and less than or equal to 4 mm, greater than or equal to 500 μm and less than or equal to 3 mm, greater than or equal to 500 μm and less than or equal to 2 mm, greater than or equal to 750 μm and less than or equal to 6 mm, greater than or equal to 750 μm and less than or equal to 5 mm, greater than or equal to 750 μm and less than or equal to 4 mm, greater than or equal to 750 μm and less than or equal to 3 mm, greater than or equal to 750 μm and less than or equal to 2 mm, greater than or equal to 1 mm and less than or equal to 6 mm, greater than or equal to 1 mm and less than or equal to 5 mm, greater than or equal to 1 mm and less than or equal to 4 mm, greater than or equal to 1 mm and less than or equal to 3 mm, or even greater than or equal to 1 mm and less than or equal to 2 mm, or any and all sub-ranges formed from any of these endpoints.

As discussed hereinabove, the glass compositions described herein may have increased fracture toughness such that the glass compositions are more resistant to damage. In embodiments, the glass compositions may have a $K_{Ic}$ fracture toughness greater than or equal to 0.75 MPa·m$^{1/2}$, greater than or equal to 0.8 MPa·m$^{1/2}$, greater than or equal to 0.9 MPa·m$^{1/2}$, greater than or equal to 1.0 MPa·m$^{1/2}$, or even greater than or equal to 1.1 MPa·m$^{1/2}$.

In embodiments, the glass composition may have a Young's modulus greater than or equal to 70 GPa, greater than or equal to 75 GPa, or even greater than or equal to 80 GPa. In embodiments, the glass composition may have a Young's modulus less than or equal to 120 GPa, less than or equal to 110 GPa, or even less than or equal to 100 GPa. In embodiments, the glass composition may have a Young's modulus greater than or equal to 70 GPa and less than or equal to 120 GPa, greater than or equal to 70 GPa and less than or equal to 110 GPa, greater than or equal to 70 GPa and less than or equal to 100 GPa, greater than or equal to 75 GPa and less than or equal to 120 GPa, greater than or equal to 75 GPa and less than or equal to 110 GPa, greater than or equal to 75 GPa and less than or equal to 100 GPa, greater than or equal to 80 GPa and less than or equal to 120 GPa, greater than or equal to 80 GPa and less than or equal to 110 GPa, or even greater than or equal to 80 GPa and less than or equal to 100 GPa, or any and all sub-ranges formed from any of these endpoints.

In embodiments, the glass compositions described herein may have a relatively high ratio of $K_{Ic}$ fracture toughness to Young's modulus, which increases the fracture energy such that the glass compositions are more resistant to damage. In embodiments, a ratio of $K_{Ic}$ fracture toughness to Young's modulus of the glass composition may be greater than or equal to 0.0095 m$^{1/2}$. In embodiments, a ratio of $K_{Ic}$ fracture toughness to Young's modulus of the glass composition may be greater than or equal to 0.01 m$^{1/2}$.

In embodiments, the glass compositions described herein may have a relatively high Poisson's ratio, which increases the fracture energy such that the glass compositions are more resistant to damage. In embodiments, the glass composition may have a Poisson's ratio greater than or equal to 0.22, greater than or equal to 0.23, or even greater than or equal to 0.24. In embodiments, the glass composition may have a Poisson's ratio less than or equal to 0.28, less than or equal to 0.27, or even less than or equal to 0.26. In embodiments, the glass composition may have a Poisson's ratio greater than or equal to 0.22 and less than or equal to 0.28, greater than or equal to 0.22 and less than or equal to 0.27, greater than or equal to 0.22 and less than or equal to 0.26, greater than or equal to 0.23 and less than or equal to 0.28, greater than or equal to 0.23 and less than or equal to 0.27, greater than or equal to 0.23 and less than or equal to 0.26, greater than or equal to 0.24 and less than or equal to 0.28, greater than or equal to 0.24 and less than or equal to 0.27, or even greater than or equal to 0.24 and less than or equal to 0.26, or any and all sub-ranges formed by any of these endpoints.

In embodiments, the glass composition may have a density greater than or equal to 2.3 g/cm$^3$, greater than or equal to 2.35 g/cm$^3$, or even greater than or equal to 2.4 g/cm$^3$. In embodiments, the glass composition may have a density less than or equal to 2.6 g/cm$^3$, less than or equal to 2.55 g/cm$^3$, or even less than or equal to 2.5 g/cm$^3$. In embodiments, the glass composition may have a density greater than or equal to 2.3 g/cm$^3$ and less than or equal to 2.6 g/cm$^3$, greater than or equal to 2.3 g/cm$^3$ and less than or equal to 2.55 g/cm$^3$, greater than or equal to 2.3 g/cm$^3$ and less than or equal to 2.5 g/cm$^3$, greater than or equal to 2.35 g/cm$^3$ and less than or equal to 2.6 g/cm$^3$, greater than or equal to 2.35 g/cm$^3$ and less than or equal to 2.55 g/cm$^3$, greater than or equal to 2.35 g/cm$^3$ and less than or equal to 2.5 g/cm$^3$, greater than or equal to 2.4 g/cm$^3$ and less than or equal to 2.6 g/cm$^3$, greater than or equal to 2.4 g/cm$^3$ and less than or equal to 2.55 g/cm$^3$, or even greater than or equal to 2.4 g/cm$^3$ and less than or equal to 2.5 g/cm$^3$, or any and all sub-ranges formed from any of these endpoints.

In embodiments, the glass composition may have a CTE at 300° C. cooling greater than or equal to 3 ppm, greater than or equal to 4 ppm, or even greater than or equal to 5 ppm. In embodiments, the glass composition may have a CTE at 300° C. cooling less than or equal to 8 ppm, less than or equal to 7 ppm, or even less than or equal to 6 ppm. In embodiments, the glass composition may have a CTE at 300° C. cooling greater than or equal to 3 ppm and less than or equal to 8 ppm, greater than or equal to 3 ppm and less than or equal to 7 ppm, greater than or equal to 3 ppm and less than or equal to 6 ppm, greater than or equal to 4 ppm and less than or equal to 8 ppm, greater than or equal to 4 ppm and less than or equal to 7 ppm, greater than or equal to 4 ppm and less than or equal to 6 ppm, greater than or equal to 5 ppm and less than or equal to 8 ppm, greater than or equal to 5 ppm and less than or equal to 7 ppm, or even greater than or equal to 5 ppm and less than or equal to 6 ppm, or any and all sub-ranges formed from any of these endpoints.

In embodiments, the glass composition may have a CTE at 50° C. cooling greater than or equal to 3 ppm, greater than or equal to 4 ppm, or even greater than or equal to 5 ppm. In embodiments, the glass composition may have a CTE at 50° C. cooling less than or equal to 8 ppm, less than or equal to 7 ppm, or even less than or equal to 6 ppm. In embodiments, the glass composition may have a CTE at 50° C. cooling greater than or equal to 3 ppm and less than or equal to 8 ppm, greater than or equal to 3 ppm and less than or equal to 7 ppm, greater than or equal to 3 ppm and less than or equal to 6 ppm, greater than or equal to 4 ppm and less than or equal to 8 ppm, greater than or equal to 4 ppm and less than or equal to 7 ppm, greater than or equal to 4 ppm and less than or equal to 6 ppm, greater than or equal to 5 ppm and less than or equal to 8 ppm, greater than or equal to 5 ppm and less than or equal to 7 ppm, or even greater than or equal to 5 ppm and less than or equal to 6 ppm, or any and all sub-ranges formed from any of these endpoints.

In embodiments, the glass composition may have a strain point greater than or equal to 400° C., greater than or equal to 450° C., or even greater than or equal to 500° C. In embodiments, the glass composition may have a strain point less than or equal to 700° C., less than or equal to 650° C., or even less than or equal to 600° C. In embodiments, the glass composition may have a strain point greater than or equal to 400° C. and less than or equal to 700° C., greater than or equal to 400° C. and less than or equal to 650° C., greater than or equal to 400° C. and less than or equal to 600° C., greater than or equal to 450° C. and less than or equal to 700° C., greater than or equal to 450° C. and less than or equal to 650° C., greater than or equal to 450° C. and less than or equal to 600° C., greater than or equal to 500° C. and less than or equal to 700° C., greater than or equal to 500° C. and less than or equal to 650° C., or even greater than or equal to 500° C. and less than or equal to 600° C., or any and all sub-ranges formed from any of these endpoints.

In embodiments, the glass composition may have an annealing point greater than or equal to 500° C. or even greater than or equal to 550° C. In embodiments, the glass composition may have an annealing point less than or equal to 800° C. or even less than or equal to 700° C. In embodiments, the glass composition may have an annealing point greater than or equal to 500° C. and less than or equal to 800° C., greater than or equal to 500° C. and less than or equal to 700° C., greater than or equal to 550° C. and less than or equal to 800° C., or even greater than or equal to 550° C. and less than or equal to 700° C., or any and all sub-ranges formed from any of these endpoints.

In embodiments, the glass composition may have a softening point greater than or equal to 600° C. or even greater than or equal to 700° C. In embodiments, the glass composition may have a softening point less than or equal to 900° C. or even less than or equal to 800° C. In embodiments, the glass composition may have a softening point greater than or equal to 600° C. and less than or equal to 900° C., greater than or equal to 600° C. and less than or equal to 800° C., greater than or equal to 700° C. and less than or equal to 900° C., or even greater than or equal to 700° C. and less than or equal to 800° C., or any and all sub-ranges formed from any of these endpoints.

In embodiments, the glass composition may have a shear modulus greater than or equal to 25 GPa, greater than or equal to 30 GPa, or even greater than or equal to 32 GPa. In embodiments, the glass composition may have a shear modulus less than or equal to 50 GPa, less than or equal to 45 GPa, or even less than or equal to 43 GPa. In embodiments, the glass composition may have a shear modulus greater than or equal to 25 GPa and less than or equal to 50 GPa, greater than or equal to 25 GPa and less than or equal to 45 GPa, greater than or equal to 25 GPa and less than or equal to 43 GPa, greater than or equal to 30 GPa and less than or equal to 50 GPa, greater than or equal to 30 GPa and less than or equal to 45 GPa, greater than or equal to 30 GPa and less than or equal to 43 GPa, greater than or equal to 32 GPa and less than or equal to 50 GPa, greater than or equal to 32 GPa and less than or equal to 45 GPa, or even greater than or equal to 32 GPa and less than or equal to 43 GPa, or any and all sub-ranges formed from any of these endpoints.

In embodiments, the glass composition may have a refractive index greater than or equal to 1.4, greater than or equal to 1.45, or even greater than or equal to 1.5. In embodiments, the glass composition may have a refractive index less than or equal to 1.6 or even less than or equal to 1.55. In embodiments, the glass composition may have a refractive index greater than or equal to 1.4 and less than or equal to 1.6, greater than or equal to 1.4 and less than or equal to 1.55, greater than or equal to 1.45 and less than or equal to 1.6, greater than or equal to 1.45 and less than or equal to 1.55, greater than or equal to 1.5 and less than or equal to 1.6, or even greater than or equal to 1.5 and less than or equal to 1.55, or any and all sub-ranges formed from any of these endpoints.

In embodiments, the glass composition may have a stress optical coefficient (SOC) greater than or equal to 2.25 nm/mm/MPa or even greater than or equal to 2.5 nm/mm/MPa. In embodiments, the glass composition may have a SOC less than or equal to 3.75 nm/mm/MPa or even less than or equal to 3.5 nm/mm/MPa. In embodiments, the glass composition may have a SOC greater than or equal to 2.25 nm/mm/MPa and less than or equal to 3.75 nm/mm/MPa, greater than or equal to 2.25 nm/mm/MPa and less than or equal to 3.5 nm/mm/MPa, greater than or equal to 2.5 nm/mm/MPa and less than or equal to 3.75 nm/mm/MPa, or even greater than or equal to 2.5 nm/mm/MPa and less than or equal to 3.5 nm/mm/MPa, or any and all sub-ranges formed from any of these endpoints.

In embodiments, the glass composition may have a liquidus viscosity greater than or equal to 1 P, greater than or equal to 50 P, or even greater than or equal to 100 P. In embodiments, the glass composition may have a liquidus viscosity less than or equal to 2 kP, less than or equal to 1 kP, or even less than or equal to 0.5 kP. In embodiments, the glass composition may have a liquidus viscosity greater than or equal to 1 P and less than or equal to 2 kP, greater than or equal to 1 P and less than or equal to 1 kP, greater than or equal to 1 P and less than or equal to 0.5 kP, greater than or equal to 50 P and less than or equal to 2 kP, greater than or equal to 50 P and less than or equal to 1 kP, greater than or equal to 50 P and less than or equal to 0.5 kP, greater than or equal to 100 P and less than or equal to 2 kP, greater than or equal to 100 P and less than or equal to 1 kP, or even greater than or equal to 100 P and less than or equal to 0.5 kP, or any and all sub-ranges formed from any of these endpoints. These ranges of viscosities allow the glass compositions to be formed into sheets by a variety of different techniques including, without limitation, fusion forming, slot draw, floating, rolling, and other sheet-forming processes known to those in the art. However, it should be understood that other processes may be used for forming other articles (i.e., other than sheets).

In embodiments, the glass compositions described herein are ion exchangeable to facilitate strengthening the glass article made from the glass compositions. In typical ion exchange processes, smaller metal ions in the glass compositions are replaced or "exchanged" with larger metal ions of the same valence within a layer that is close to the outer surface of the glass article made from the glass composition. The replacement of smaller ions with larger ions creates a compressive stress within the layer of the glass article made from the glass composition. In embodiments, the metal ions are monovalent metal ions (e.g., $Li^+$, $Na^+$, $K^+$, and the like), and ion exchange is accomplished by immersing the glass article made from the glass composition in a bath comprising at least one molten salt of the larger metal ion that is to replace the smaller metal ion in the glass article. Alternatively, other monovalent ions such as $Ag^+$, $Tl^+$, $Cu^+$, and the like may be exchanged for monovalent ions. The ion exchange process or processes that are used to strengthen the glass article made from the glass composition may include, but are not limited to, immersion in a single bath or multiple baths of like or different compositions with washing and/or annealing steps between immersions.

Upon exposure to the glass composition, the ion exchange solution (e.g., $KNO_3$ and/or $NaNO_3$ molten salt bath) may, according to embodiments, be at a temperature in greater than or equal to 350° C. and less than or equal to 500° C., greater than or equal to 360° C. and less than or equal to 450° C., greater than or equal to 370° C. and less than or equal to 440° C., greater than or equal to 360° C. and less than or equal to 420° C., greater than or equal to 370° C. and less than or equal to 400° C., greater than or equal to 375° C. and less than or equal to 475° C., greater than or equal to 400° C. and less than or equal to 500° C., greater than or equal to 410° C. and less than or equal to 490° C., greater than or equal to 420° C. and less than or equal to 480° C., greater than or equal to 430° C. and less than or equal to 470° C., or even greater than or equal to 440° C. and less than or equal to 460° C., or any and all sub-ranges between the foregoing values. In embodiments, the glass composition may be exposed to the ion exchange solution for a duration greater than or equal to 2 hours and less than or equal to 48 hours, greater than or equal to 2 hours and less than or equal to 24 hours, greater than or equal to 2 hours and less than or equal to 12 hours, greater than or equal to 2 hours and less than or equal to 6 hours, greater than or equal to 8 hours and less than or equal to 44 hours, greater than or equal to 12 hours and less than or equal to 40 hours, greater than or equal to 16 hours and less than or equal to 36 hours, greater than or equal to 20 hours and less than or equal to 32 hours, or even greater than or equal to 24 hours and less than or equal to 28 hours, or any and all sub-ranges between the foregoing values.

The resulting compressive stress layer may have a depth (also referred to as a "depth of compression" or "DOC") of at least 100 μm on the surface of the glass article in 2 hours of ion exchange time. In embodiments, the glass articles made from the glass compositions may be ion exchanged to achieve a depth of compression greater than or equal to 10 μm, greater than or equal to 20 μm, greater than or equal to 30 μm, greater than or equal to 40 μm, greater than or equal to 50 μm, greater than or equal to 60 μm, greater than or equal to 70 μm, greater than or equal to 80 μm, greater than or equal to 90 μm, or even greater than or equal to 100 μm. In embodiments, the glass articles made from the glass compositions may be ion exchanged to achieve a central tension of at least 10 MPa. The development of this surface compression layer is beneficial for achieving a better crack resistance and higher flexural strength compared to non-ion-exchanged materials. The surface compression layer has a higher concentration of the ions exchanged into the glass article in comparison to the concentration of the ions exchanged into the glass article for the body (i.e., the area not including the surface compression) of the glass article.

In embodiments, the glass article may have a thickness t and a DOC less than or equal to 0.32 t, less than or equal to 0.3 t, less than or equal to 0.28 t, or even less than or equal to 0.26 t.

In embodiments, the glass article made from the glass composition may have a surface compressive stress after ion exchange strengthening greater than or equal to 20 MPa, greater than or equal to 50 MPa, greater than or equal to 75 MPa, greater than or equal to 100 MPa, greater than or equal to 250 MPa, greater than or equal to 500 MPa, greater than or equal to 750 MPa, or even greater than or equal to 1 GPa. In embodiments, the glass article made from the glass composition may have a surface compressive stress after ion exchange strengthening greater than or equal to 20 MPa and less than or equal to 1 GPa, greater than or equal to 20 MPa and less than or equal to 750 MPa, greater than or equal to 20 MPa and less than or equal to 500 MPa, greater than or equal to 20 MPa and less than or equal to 250 MPa, greater than or equal to 50 MPa and less than or equal to 1 GPa, greater than or equal to 50 MPa and less than or equal to 750 MPa, greater than or equal to 50 MPa and less than or equal to 500 MPa, greater than or equal to 50 MPa and less than or equal to 250 MPa, greater than or equal to 75 MPa and less than or equal to 1 GPa, greater than or equal to 75 MPa and less than or equal to 750 MPa, greater than or equal to 75 MPa and less than or equal to 500 MPa, greater than or equal to 75 MPa and less than or equal to 250 MPa, greater than or equal to 100 MPa and less than or equal to 1 GPa, greater than or equal to 100 MPa and less than or equal to 750 MPa, greater than or equal to 100 MPa and less than or equal to 500 MPa, greater than or equal to 100 MPa and less than or equal to 250 MPa, greater than or equal to 250 MPa and less than or equal to 1 GPa, greater than or equal to 250 MPa and less than or equal to 750 MPa, greater than or equal to 250 MPa and less than or equal to 500 MPa, greater than or equal to 500 MPa and less than or equal to 1 GPa, greater than or equal to 500 MPa and less than or equal to 750 MPa, or even greater than or equal to 750 MPa and less than or equal to 1 GPa, or any and all sub-ranges formed from any of these endpoints.

In embodiments, the glass article made from the glass composition may have a central tension after ion exchange strengthening greater than or equal to 10 MPa, greater than or equal to 25 MPa, or even greater than or equal to 50 MPa. In embodiments, the glass article made from the glass composition may have a central tension after ion exchange strengthening less than or equal to 250 MPa, less than or equal to 200 MPa, or even less than or equal to 150 MPa. In embodiments, the glass article made from the glass composition may have a central tension after ion exchange strengthening greater than or equal to 10 MPa and less than or equal to 250 MPa, greater than or equal to 25 MPa and less than or equal to 250 MPa, greater than or equal to 50 MPa and less than or equal to 250 MPa, greater than or equal to 10 MPa and less than or equal to 200 MPa, greater than or equal to 25 MPa and less than or equal to 200 MPa, greater than or equal to 50 MPa and less than or equal to 200 MPa, greater than or equal to 10 MPa and less than or equal to 150 MPa, greater than or equal to 25 MPa and less than or equal to 150 MPa, or even greater than or equal to 50 MPa and less than or equal to 150 MPa, or any and all sub-ranges formed from any of these endpoints.

In embodiments, the process for making a glass article includes heat treating the glass composition at one or more preselected temperatures for one or more preselected times to induce glass homogenization. In embodiments, the heat treatment for making a glass article may include (i) heating a glass composition at a rate of 1-100 C/min to glass homogenization temperature; (ii) maintaining the glass composition at the glass homogenization temperature for a time greater than or equal to 0.25 hour and less than or equal to 4 hours to produce a glass article; and (iii) cooling the formed glass article to room temperature. In embodiments, the glass homogenization temperature may be greater than or equal to 300° C. and less than or equal to 700° C.

As described hereinabove, the glass compositions described herein maybe subjected to various cooling schedules to produce glass-ceramic articles having different average transmissions. In embodiments, the glass article may be transparent (i.e., having an average transmission of greater than or equal to 75%), translucent (i.e., having an average transmission greater than or equal to 20% and less than or equal to 75%), or opaque (i.e., having an average transmission less than 20%).

In embodiments, the process for making a glass-ceramic article may be performed directly post-forming (e.g., rolling, casting, fusion, slot draw, float, etc.) without the need to perform a reheating step. Referring now to FIG. 1, as shown with reference to thermal profile A, the cooling scheduling may include (i) cooling a formed glass composition at an average cooling rate greater than or equal to 1° C./min and less than or equal to 500° C./min from a forming process temperature $T_1$ (i.e., a melt) to a nucleation temperature range $T_2$; (ii) maintaining the formed glass composition at the nucleation temperature range $T_2$ for a time greater than or equal to 60 seconds and less than or equal to 48 hours to produce a glass-ceramic article; (iii) cooling the formed glass-ceramic article at an average cooling rate greater than or equal to 1° C./min and less than or equal to 500° C./min to the effective annealing temperature of the glass-ceramic article±20° C. $T_3$; (iv) maintaining the glass-ceramic article at the effective annealing temperature of the glass-ceramic article±20° C. $T_3$ for a time greater than or equal to 15 minutes and less than or equal to 1 hour; and (v) cooling the glass-ceramic article to room temperature $T_4$.

In embodiments, referring now to thermal profile B in FIG. 1, the cooling schedule may not include cooling to an effective annealing temperature. Accordingly, in embodiments, the cooling schedule may include (i) cooling a formed glass composition at an average cooling rate greater than or equal to 1° C./min and less than or equal to 500° C./min from a forming process temperature $T_1$ to a nucleation temperature range $T_1$; (ii) maintaining the formed glass composition at the nucleation temperature range $T_2$ for a time greater than or equal to 60 seconds and less than or equal to 48 hours to form a glass-ceramic article; (iii) cooling the glass-ceramic article to room temperature $T_4$.

In embodiments, any of the cooling schedules described hereinabove may have a cooling rate that is constant or varies.

In embodiments, a higher average cooling rate from the forming process temperature $T_1$ to the nucleation temperature range $T_2$ may result in a transparent glass article. While not wishing to be bound by theory, it is believed that the glass article will remain transparent because with a higher average cooling rate, the glass article does not spend enough time at a higher temperature (e.g., $T_2$) to devitrify the glass. In embodiments, a lower average cooling rate from the forming process temperature Tito the nucleation temperature range $T_2$ may result in an opaque glass article. While not wishing to be bound by theory, it is believed that the glass article will become opaque because with a lower average cooling rate, the glass article spends a sufficient time at a high temperature (e.g., $>T_2$) to devitrify the glass.

In embodiments, the nucleation temperature range $T_2$ may be greater than or equal to 1000° C. and less than or equal to 1600° C., greater than or equal to 1100° C. and less than or equal to 1500° C., or even greater than or equal to 1200° C. or less than or equal to 1400° C.

Cooling schedules are judiciously prescribed so as to produce one or more of the following desired attributes: crystalline phase(s) of the glass-ceramic, proportions of one or more major crystalline phases and/or one or more minor crystalline phases and glass, crystal phase assemblages of one or more predominate crystalline phases and/or one or more minor crystalline phases and glass, and grain sizes or grain size distribution among one or more major crystalline phases and/or one or more minor crystalline phases, which in turn may influence the final integrity, quality, color, and/or opacity of the resultant glass-ceramic. In embodiments, the crystalline phase of the glass-ceramic may include, but is not limited to, boromullite, corundum, spodumene, spinel, mullite, or a combination thereof.

As described hereinabove, the glass compositions described herein may be subjected to these various cooling schedules to produce glass-ceramic articles having different colors. In embodiments, the glass-ceramic article may be white (i.e., having a transmittance color coordinate in the CIELAB color space of L* greater than or equal to 80; |a*| less than or equal to 2; and |b*| less than or equal to 3) or patterned (i.e., having a first transmittance color coordinate in the white CIELAB color space and a second transmittance color coordinate in a different CIELAB color space different than the white CIELAB color space).

In embodiments, the glass-ceramic article may have an lightness L* value in the CIELAB color space greater than or equal to 70 and less than or equal to 98. In embodiments, the glass-ceramic article may have a red/green value a* in the CIELAB color space greater than or equal to −2 and less than or equal to 3. In embodiments, the glass-ceramic article may have a blue/yellow value b* in the CIELAB color space greater than or equal to −2 and less than or equal to 6.

In embodiments, the one or more crystalline phases may be non-alkali containing. In particular, the alkali present in the glass composition may be in the residual glass phase after crystallization and, as such, susceptible to ion exchange.

The resultant glass-ceramic may be provided as a sheet, which may then be reformed by pressing, blowing, bending, sagging, vacuum forming, or other means into curved or bent pieces of uniform thickness. Reforming may be done before thermally treating or the forming step may also serve as a thermal treatment step in which both forming and thermal treating are performed substantially simultaneously.

The glass compositions described herein may be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In embodiments, a consumer electronic device (e.g., smartphones, tablet computers, personal computers, ultrabooks, televisions, and cameras), an architectural glass, and/or an automotive glass may comprise a glass article as described herein. An exemplary article incorporating any of the glass compositions disclosed herein may be a consumer electronic device including a housing; electrical components that are at least partially inside or entirely within the housing and including at least a controller, a memory, and a display at or adjacent to the front surface of the housing; and a cover substrate at or over the front surface of the housing such that it is over the display. In some embodiments, at least a portion of at least one of the cover substrate and/or the housing may include any of the glass compositions disclosed herein.

Examples

In order that various embodiments be more readily understood, reference is made to the following examples, which are intended to illustrate various embodiments of the glass compositions described herein.

Table 1 shows glass compositions (in terms of mol %) and the respective properties of the glass compositions. Glasses are formed having the glass compositions 1-67.

TABLE 1

| Example | 1 | 2 | 3 | 4 | 5 | 6 | 7 |
|---|---|---|---|---|---|---|---|
| $SiO_2$ | 36.60 | 38.12 | 48.61 | 46.61 | 44.65 | 51.14 | 52.93 |
| $Al_2O_3$ | 29.16 | 27.89 | 24.81 | 26.76 | 28.67 | 28.33 | 28.30 |
| $B_2O_3$ | 19.60 | 19.32 | 13.54 | 13.69 | 13.64 | 7.65 | 5.83 |
| $Li_2O$ | 14.57 | 14.60 | 10.92 | 10.83 | 10.93 | 10.82 | 10.88 |
| $Na_2O$ | 0.01 | 0.01 | 1.93 | 1.92 | 1.92 | 1.86 | 1.86 |
| $K_2O$ | 0 | 0 | 0.03 | 0.03 | 0.03 | 0.04 | 0.04 |
| MgO | 0.03 | 0.03 | 0.03 | 0.04 | 0.03 | 0.04 | 0.04 |
| CaO | 0 | 0 | 0.03 | 0.04 | 0.04 | 0.03 | 0.03 |
| $SnO_2$ | 0 | 0 | 0.06 | 0.06 | 0.06 | 0.05 | 0.05 |
| $Fe_2O_3$ | 0 | 0 | 0 | 0 | 0 | 0 | 0 |
| $Al_2O_3 + B_2O_3$ | 48.76 | 47.21 | 38.35 | 40.45 | 42.31 | 35.98 | 34.13 |
| $R_2O$ | 14.58 | 14.61 | 12.88 | 12.78 | 12.88 | 12.72 | 12.78 |
| RO | 0.03 | 0.03 | 0.06 | 0.08 | 0.07 | 0.07 | 0.07 |
| $R_2O + RO$ | 14.61 | 14.64 | 12.94 | 12.86 | 12.95 | 12.79 | 12.85 |
| $Al_2O_3 - R_2O - RO$ | 14.55 | 13.25 | 11.87 | 13.90 | 15.72 | 15.54 | 15.45 |
| $Al_2O_3 + B_2O_3 - R_2O - RO$ | 34.15 | 32.57 | 25.41 | 27.59 | 29.36 | 23.19 | 21.28 |
| Density (g/cm³) | — | — | — | — | — | — | — |
| CTE at 300° C. cooling (ppm) | — | — | — | — | — | — | — |
| CTE at 50° C. cooling (ppm) | — | — | — | — | — | — | — |
| Strain Pt. (° C.) | — | — | 558.1 | 565.6 | 578.2 | — | — |
| Anneal Pt. (° C.) | — | — | 601.3 | 608.6 | 619.2 | — | — |
| Softening Pt. (° C.) | — | — | — | — | — | — | — |
| Young's Modulus (GPa) | 82.61 | 81.37 | 82.13 | 84.75 | 86.61 | 89.5 | 90.4 |
| Shear modulus (GPa) | 32.87 | 32.18 | 32.66 | 33.49 | 34.59 | 35.97 | 36.31 |
| Poisson's ratio | 0.257 | 0.263 | 0.259 | 0.265 | 0.252 | 0.245 | 0.244 |
| Refractive index | — | — | 1.5287 | 1.5333 | 1.5373 | — | — |
| SOC (nm/mm/MPa) | — | — | 3.101 | 3.037 | 2.983 | — | — |
| VFT A | — | — | — | — | — | — | — |
| VFT B | — | — | — | — | — | — | — |
| VFT To | — | — | — | — | — | — | — |
| Liquidus (gradient boat) duration (hours) | — | — | — | — | — | — | — |
| Air interface liquidus temperature | — | — | — | — | — | >1275 | >1305 |
| Internal liquidus temperature | — | — | — | — | — | >1275 | >1305 |
| Platinum interface liquidus temperature | — | — | — | — | — | >1275 | >1305 |
| Primary Phase | — | — | — | — | — | Corundum | Corundum |
| Liquidus Viscosity (kP) | — | — | — | — | — | — | — |
| $K_{Ic}$ (CN) (MPa·m$^{1/2}$) | — | 1.033 | — | — | — | 0.91 | 0.916 |
| Standard Deviation (CN) | — | — | — | — | — | — | — |
| $K_{Ic}$/Young's Modulus (m$^{1/2}$) | — | 0.0127 | — | — | — | 0.0102 | 0.0101 |

| Example | 8 | 9 | 10 | 11 | 12 | 13 | 14 |
|---|---|---|---|---|---|---|---|
| $SiO_2$ | 54.91 | 40.35 | 40.45 | 40.39 | 40.37 | 40.02 | 40.38 |
| $Al_2O_3$ | 28.28 | 27.87 | 27.91 | 27.87 | 27.93 | 28.10 | 27.88 |
| $B_2O_3$ | 3.88 | 3.98 | 3.89 | 3.89 | 3.95 | 3.99 | 3.92 |
| $Li_2O$ | 10.85 | 15.68 | 16.60 | 14.79 | 13.68 | 12.76 | 11.82 |
| $Na_2O$ | 1.86 | 0.93 | 0.93 | 0.92 | 0.93 | 0.92 | 0.93 |
| $K_2O$ | 0.04 | 0.29 | 0.30 | 0.28 | 0.30 | 0.30 | 0.28 |
| MgO | 0.04 | 10.75 | 9.78 | 11.72 | 12.70 | 13.76 | 14.65 |
| CaO | 0.03 | 0.06 | 0.06 | 0.06 | 0.07 | 0.07 | 0.07 |
| $SnO_2$ | 0.05 | 0.05 | 0.05 | 0.06 | 0.05 | 0.05 | 0.05 |
| $Fe_2O_3$ | 0 | 0 | 0 | 0 | 0 | 0 | 0 |
| $Al_2O_3 + B_2O_3$ | 32.16 | 31.85 | 31.80 | 31.76 | 31.88 | 32.09 | 31.80 |
| $R_2O$ | 12.75 | 16.90 | 17.83 | 15.99 | 14.91 | 13.98 | 13.03 |
| RO | 0.07 | 10.81 | 9.84 | 11.78 | 12.77 | 13.83 | 14.72 |
| $R_2O + RO$ | 12.82 | 27.71 | 27.67 | 27.77 | 27.68 | 27.81 | 27.75 |
| $Al_2O_3 - R_2O - RO$ | 15.46 | 0.16 | 0.24 | 0.10 | 0.25 | 0.29 | 0.13 |
| $Al_2O_3 + B_2O_3 - R_2O - RO$ | 19.34 | 4.14 | 4.13 | 3.99 | 4.20 | 4.28 | 4.05 |
| Density (g/cm³) | — | — | — | — | — | — | — |
| CTE at 300° C. cooling (ppm) | — | — | — | — | — | — | — |
| CTE at 50° C. cooling (ppm) | — | — | — | — | — | — | — |
| Strain Pt. (° C.) | — | 580.4 | 574.6 | 587.4 | 591.3 | 594.3 | 602.6 |

TABLE 1-continued

| | | | | | | | |
|---|---|---|---|---|---|---|---|
| Anneal Pt. (° C.) | — | 618.1 | 612.6 | 624.9 | 629.1 | 632.8 | 640.8 |
| Softening Pt. (° C.) | — | 778.5 | 778 | 784.1 | 789.3 | 797.7 | 800.2 |
| Young's Modulus (GPa) | 91.84 | 97.22 | 96.6 | 98.6 | 99.15 | 100.18 | 101.15 |
| Shear modulus (GPa) | 37 | 38.93 | 38.58 | 39.2 | 39.41 | 39.62 | 40.17 |
| Poisson's ratio | 0.242 | 0.249 | 0.25 | 0.257 | 0.258 | 0.264 | 0.26 |
| Refractive index | — | 1.5565 | 1.5558 | 1.5577 | 1.5584 | 1.5592 | 1.5604 |
| SOC (nm/mm/MPa) | — | 2.493 | 2.496 | 2.494 | 2.503 | 2.483 | 2.477 |
| VFT A | — | — | — | — | — | — | — |
| VFT B | — | — | — | — | — | — | — |
| VFT To | — | — | — | — | — | — | — |
| Liquidus (gradient boat) duration (hours) | — | — | — | — | — | — | — |
| Air interface liquidus temperature | >1290 | >1455 | >1465 | >1320 | >1325 | >1305 | >1250 |
| Internal liquidus temperature | >1290 | >1455 | >1465 | >1320 | >1325 | >1305 | >1250 |
| Platinum interface liquidus temperature | >1290 | >1455 | >1465 | >1320 | >1325 | >1305 | >1250 |
| Primary Phase | Corundum | Spinel | Spinel | Spinel | Spinel | Spinel | Spinel |
| Liquidus Viscosity (kP) | — | — | — | — | — | — | — |
| $K_{Ic}$ (CN) (MPa·$m^{1/2}$) | 0.908 | — | — | — | — | — | — |
| Standard Deviation (CN) | — | — | — | — | — | — | — |
| $K_{Ic}$/Young's Modulus ($m^{1/2}$) | 0.0099 | — | — | — | — | — | — |

| Example | 15 | 16 | 17 | 18 | 19 | 20 | 21 |
|---|---|---|---|---|---|---|---|
| $SiO_2$ | 46.72 | 40.64 | 37.99 | 36.23 | 34.06 | 31.37 | 29.59 |
| $Al_2O_3$ | 26.84 | 27.84 | 25.84 | 25.86 | 26.09 | 26.65 | 26.21 |
| $B_2O_3$ | 13.64 | 7.73 | 21.49 | 23.26 | 25.10 | 27.25 | 29.58 |
| $Li_2O$ | 10.73 | 13.70 | 12.84 | 12.84 | 12.93 | 12.95 | 12.82 |
| $Na_2O$ | 1.71 | 0.93 | 1.46 | 1.46 | 1.47 | 1.43 | 1.44 |
| $K_2O$ | 0.20 | 0.28 | 0.20 | 0.20 | 0.20 | 0.20 | 0.20 |
| MgO | 0.03 | 8.74 | 0.03 | 0.03 | 0.03 | 0.03 | 0.03 |
| CaO | 0.04 | 0.06 | 0.03 | 0.03 | 0.03 | 0.03 | 0.03 |
| $SnO_2$ | 0.06 | 0.05 | 0.06 | 0.05 | 0.06 | 0.05 | 0.06 |
| $Fe_2O_3$ | 0 | 0 | 0 | 0 | 0 | 0 | 0 |
| $Al_2O_3 + B_2O_3$ | 40.48 | 35.57 | 47.33 | 49.12 | 51.19 | 53.90 | 55.79 |
| $R_2O$ | 12.64 | 14.91 | 14.50 | 14.50 | 14.60 | 14.58 | 14.46 |
| RO | 0.07 | 8.80 | 0.06 | 0.06 | 0.06 | 0.06 | 0.06 |
| $R_2O + RO$ | 12.71 | 23.71 | 14.56 | 14.56 | 14.66 | 14.64 | 14.52 |
| $Al_2O_3 - R_2O - RO$ | 14.13 | 4.13 | 11.28 | 11.30 | 11.43 | 12.01 | 11.69 |
| $Al_2O_3 + B_2O_3 - R_2O - RO$ | 27.77 | 11.86 | 32.77 | 34.56 | 36.53 | 39.26 | 41.27 |
| Density (g/$cm^3$) | — | — | — | — | — | — | — |
| CTE at 300° C. cooling (ppm) | — | — | — | — | — | — | — |
| CTE at 50° C. cooling (ppm) | — | — | — | — | — | — | — |
| Strain Pt. (° C.) | — | — | 521.6 | 514.9 | 512.1 | 504 | 501 |
| Anneal Pt. (° C.) | — | — | 561.2 | 554 | 550.1 | 542.5 | 537.7 |
| Softening Pt. (° C.) | — | — | — | — | — | — | — |
| Young's Modulus (GPa) | 83.99 | 93.91 | 78.2 | 77.93 | 77.58 | 77.58 | 77.37 |
| Shear modulus (GPa) | 33.55 | 37.34 | 31.14 | 31.01 | 30.73 | 30.8 | 30.66 |
| Poisson's ratio | 0.251 | 0.258 | 0.256 | 0.256 | 0.261 | 0.26 | 0.26 |
| Refractive index | — | — | 1.5324 | 1.5341 | 1.5332 | 1.5345 | 1.5359 |
| SOC (nm/mm/MPa) | — | — | 3.169 | 3.216 | 3.237 | 3.25 | 3.265 |
| VFT A | — | — | — | — | — | — | — |
| VFT B | — | — | — | — | — | — | — |
| VFT To | — | — | — | — | — | — | — |
| Liquidus (gradient boat) duration (hours) | — | — | — | — | — | — | — |
| Air interface liquidus temperature | — | — | — | — | — | — | — |
| Internal liquidus temperature | — | — | — | — | — | — | — |
| Platinum interface liquidus temperature | — | — | — | — | — | — | — |
| Primary Phase | — | — | — | — | — | — | — |
| Liquidus Viscosity (kP) | — | — | — | — | — | — | — |

TABLE 1-continued

| | | | | | | | |
|---|---|---|---|---|---|---|---|
| $K_{Ic}$ (CN) (MPa·m$^{1/2}$) | 0.891 | 0.896 | — | — | — | — | — |
| Standard Deviation (CN) | — | — | — | — | — | — | — |
| $K_{Ic}$/Young's Modulus (m$^{1/2}$) | 0.0106 | 0.0095 | — | — | — | — | — |

| Example | 22 | 23 | 24 | 25 | 26 | 27 | 28 |
|---|---|---|---|---|---|---|---|
| $SiO_2$ | 28.56 | 43.43 | 40.76 | 44.58 | 42.71 | 39.89 | 42.54 |
| $Al_2O_3$ | 25.82 | 27.72 | 28.10 | 26.15 | 26.05 | 25.90 | 27.98 |
| $B_2O_3$ | 30.94 | 13.36 | 13.50 | 13.55 | 13.57 | 12.99 | 13.69 |
| $Li_2O$ | 12.85 | 3.97 | 4.03 | 4.01 | 4.06 | 3.91 | 9.24 |
| $Na_2O$ | 1.47 | 8.97 | 9.01 | 9.11 | 9.06 | 8.76 | 3.97 |
| $K_2O$ | 0.19 | 0.42 | 0.43 | 0.44 | 0.44 | 0.39 | 0.44 |
| MgO | 0.03 | 2.02 | 4.06 | 2.06 | 4.00 | 8.03 | 2.03 |
| CaO | 0.03 | 0.04 | 0.06 | 0.04 | 0.06 | 0.08 | 0.04 |
| $SnO_2$ | 0.05 | 0.05 | 0.05 | 0.05 | 0.05 | 0.05 | 0.05 |
| $Fe_2O_3$ | 0 | 0.01 | 0.01 | 0.01 | 0.01 | 0.01 | 0.01 |
| $Al_2O_3 + B_2O_3$ | 56.76 | 41.08 | 41.60 | 39.70 | 39.62 | 38.89 | 41.67 |
| $R_2O$ | 14.51 | 13.36 | 13.47 | 13.56 | 13.56 | 13.06 | 13.65 |
| RO | 0.06 | 2.06 | 4.12 | 2.10 | 4.06 | 8.11 | 2.07 |
| $R_2O$ + RO | 14.57 | 15.42 | 17.59 | 15.66 | 17.62 | 21.17 | 15.72 |
| $Al_2O_3 - R_2O$ - RO | 11.25 | 12.30 | 10.51 | 10.49 | 8.43 | 4.73 | 12.26 |
| $Al_2O_3 + B_2O_3 - R_2O$ - RO | 42.19 | 25.66 | 24.01 | 24.04 | 22.00 | 17.72 | 25.95 |
| Density (g/cm$^3$) | — | 2.459 | 2.472 | 2.442 | 2.454 | 2.476 | 2.456 |
| CTE at 300° C. cooling (ppm) | — | 5.86 | 6.06 | 6.05 | 6.17 | 6.25 | 5.60 |
| CTE at 50° C. cooling (ppm) | — | 5.02 | 5.08 | 5.26 | 5.23 | 5.37 | 4.51 |
| Strain Pt. (° C.) | 487.3 | 570.0 | 567.3 | 560.2 | 554.9 | 565.2 | 564.7 |
| Anneal Pt. (° C.) | 522.3 | 614.6 | 610.8 | 604.7 | 598.6 | 606.9 | 606.7 |
| Softening Pt. (° C.) | — | — | — | — | — | 771.3 | — |
| Young's Modulus (GPa) | 77.1 | 80.3 | 81.3 | 77.8 | 79.0 | 81.7 | 84.7 |
| Shear modulus (GPa) | 30.59 | 32.1 | 32.5 | 31.3 | 31.6 | 32.5 | 33.800 |
| Poisson's ratio | 0.262 | 0.250 | 0.251 | 0.243 | 0.248 | 0.256 | 0.252 |
| Refractive index | 1.535 | 1.529713 | 1.529713 | 1.523243 | 1.526003 | 1.530873 | 1.5348 |
| SOC (nm/mm/MPa) | 3.248 | 3.055 | 3.026 | 3.131 | 3.073 | 2.963 | 2.974 |
| VFT A | — | −43.860 | 0.325 | −47.183 | 2.492 | −0.771 | −11.545 |
| VFT B | — | 427542.0 | 2247.2 | 497030.9 | 402.6 | 1852.9 | 53238.2 |
| VFT To | — | −7787.8 | 376.1 | −8571.4 | 677.8 | 642.4 | −2395.8 |
| Liquidus (gradient boat) duration (hours) | — | 24 | 24 | 24 | 24 | 24 | 24 |
| Air interface liquidus temperature | — | >1315 | >1320 | >1355 | >1330 | >1300 | >1315 |
| Internal liquidus temperature | — | >1315 | >1320 | >1355 | >1330 | >1300 | >1315 |
| Platinum interface liquidus temperature | — | >1315 | >1320 | >1355 | >1330 | >1300 | >1315 |
| Primary Phase | — | Corundum | Corundum | Corundum | Corundum | Corundum | Corundum |
| Liquidus Viscosity (kP) | — | — | — | — | — | — | <634 |
| $K_{Ic}$ (CN) (MPa·m$^{1/2}$) | — | 0.831 | 0.845 | 0.820 | 0.821 | 0.780 | 0.895 |
| Standard Deviation (CN) | — | 0.021 | 0.007 | 0.010 | 0.015 | 0.016 | 0.014 |
| $K_{Ic}$/Young's Modulus (m$^{1/2}$) | — | 0.0103 | 0.0104 | 0.0105 | 0.0104 | 0.0095 | 0.0106 |

| Example | 29 | 30 | 31 | 32 | 33 | 34 | 35 |
|---|---|---|---|---|---|---|---|
| $SiO_2$ | 40.72 | 44.62 | 42.62 | 38.72 | 40.83 | 38.78 | 37.33 |
| $Al_2O_3$ | 28.05 | 26.10 | 26.14 | 26.15 | 29.76 | 31.62 | 33.06 |
| $B_2O_3$ | 13.40 | 13.44 | 13.37 | 13.37 | 13.59 | 13.69 | 13.43 |
| $Li_2O$ | 9.28 | 9.28 | 9.32 | 9.23 | 9.19 | 9.25 | 9.44 |
| $Na_2O$ | 3.95 | 3.98 | 3.94 | 3.91 | 4.03 | 4.03 | 4.09 |
| $K_2O$ | 0.44 | 0.44 | 0.43 | 0.42 | 0.46 | 0.46 | 0.47 |
| MgO | 4.04 | 2.04 | 4.07 | 8.06 | 2.05 | 2.06 | 2.07 |
| CaO | 0.05 | 0.04 | 0.05 | 0.08 | 0.04 | 0.05 | 0.05 |
| $SnO_2$ | 0.05 | 0.05 | 0.05 | 0.05 | 0.05 | 0.06 | 0.06 |
| $Fe_2O_3$ | 0.01 | 0.01 | 0.01 | 0.01 | 0.01 | 0.01 | 0.01 |
| $Al_2O_3 + B_2O_3$ | 41.45 | 39.54 | 39.51 | 39.52 | 43.35 | 45.31 | 46.49 |
| $R_2O$ | 13.67 | 13.70 | 13.69 | 13.56 | 13.68 | 13.74 | 14.00 |
| RO | 4.09 | 2.08 | 4.12 | 8.14 | 2.09 | 2.11 | 2.12 |
| $R_2O$ + RO | 17.76 | 15.78 | 17.81 | 21.70 | 15.77 | 15.85 | 16.12 |
| $Al_2O_3 - R_2O$ - RO | 10.29 | 10.32 | 8.33 | 4.45 | 13.99 | 15.77 | 16.94 |
| $Al_2O_3 + B_2O_3 - R_2O$ - RO | 23.69 | 23.76 | 21.70 | 17.82 | 27.58 | 29.46 | 30.37 |

TABLE 1-continued

| | | | | | | | |
|---|---|---|---|---|---|---|---|
| Density (g/cm³) | 2.468 | 2.438 | 2.451 | 2.475 | — | — | — |
| CTE at 300° C. cooling (ppm) | 5.67 | 5.60 | — | 5.86 | — | — | — |
| CTE at 50° C. cooling (ppm) | 4.82 | 4.76 | — | 4.90 | — | — | — |
| Strain Pt. (° C.) | 561.6 | 556.5 | 556.5 | 552.5 | — | — | — |
| Anneal Pt. (° C.) | 602.5 | 598.0 | 597.7 | 594.3 | — | — | — |
| Softening Pt. (° C.) | — | — | — | — | — | — | — |
| Young's Modulus (GPa) | 85.8 | 82.3 | 83.6 | 86.0 | 100.7 | 105.4 | 105.4 |
| Shear modulus (GPa) | 34.200 | 33.000 | 33.300 | 34.300 | 40.2 | 42.1 | 42.0 |
| Poisson's ratio | 0.254 | 0.247 | 0.255 | 0.252 | 0.254 | 0.251 | 0.254 |
| Refractive index | 1.5375 | 1.531 | 1.5335 | 1.5395 | — | — | — |
| SOC (nm/mm/MPa) | 2.921 | 3.005 | 2.932 | 2.875 | — | — | — |
| VFT A | −1.051 | −18.366 | −13.75 | −9.87 | — | — | — |
| VFT B | 727.7 | 45528.5 | 31939.10 | 20121.90 | — | — | — |
| VFT To | 1224.3 | −758.1 | −587.80 | −301.10 | — | — | — |
| Liquidus (gradient boat) duration (hours) | 24 | 24 | 24 | 24 | — | — | — |
| Air interface liquidus temperature | >1320 | >1280 | >1300 | >1345 | — | — | — |
| Internal liquidus temperature | >1320 | >1280 | >1300 | >1345 | — | — | — |
| Platinum interface liquidus temperature | >1320 | >1280 | >1300 | >1345 | — | — | — |
| Primary Phase | Corundum | Corundum | Corundum | Corundum | — | — | — |
| Liquidus Viscosity (kP) | <3572487 | <9391 | <1475 | <226 | — | — | — |
| $K_{Ic}$ (CN) (MPa · $m^{1/2}$) | 0.893 | 0.874 | 0.875 | 0.897 | 1.110 | 1.049 | 1.136 |
| Standard Deviation (CN) | 0.009 | 0.013 | 0.016 | 0.013 | 0.045 | 0.044 | 0.019 |
| $K_{Ic}$/Young's Modulus ($m^{1/2}$) | 0.0104 | 0.0106 | 0.0105 | 0.0104 | 0.0110 | 0.0100 | 0.0108 |

| Example | 36 | 37 | 38 | 39 | 40 | 41 | 42 |
|---|---|---|---|---|---|---|---|
| $SiO_2$ | 36.40 | 35.62 | 34.74 | 50.28 | 50.43 | 44.65 | 36.60 |
| $Al_2O_3$ | 33.51 | 33.68 | 34.41 | 23.95 | 23.97 | 28.67 | 29.16 |
| $B_2O_3$ | 13.56 | 14.18 | 13.74 | 3.93 | 3.92 | 13.64 | 19.60 |
| $Li_2O$ | 9.65 | 9.91 | 10.04 | 11.95 | 9.87 | 10.93 | 14.57 |
| $Na_2O$ | 4.17 | 3.93 | 4.24 | 1.95 | 1.95 | 1.92 | 0.01 |
| $K_2O$ | 0.47 | 0.45 | 0.43 | 0.01 | 0.01 | 0.03 | 0 |
| MgO | 2.13 | 2.09 | 2.28 | 7.82 | 9.74 | 0.03 | 0.03 |
| CaO | 0.05 | 0.07 | 0.06 | 0.06 | 0.06 | 0.04 | 0 |
| $SnO_2$ | 0.06 | 0.06 | 0.05 | 0.03 | 0.03 | 0.06 | 0 |
| $Fe_2O_3$ | 0.01 | 0.01 | 0.01 | 0 | 0 | 0 | 0 |
| $Al_2O_3 + B_2O_3$ | 47.07 | 47.86 | 48.15 | 27.88 | 27.89 | 42.31 | 48.76 |
| $R_2O$ | 14.29 | 14.29 | 14.71 | 13.91 | 11.83 | 12.88 | 14.58 |
| RO | 2.18 | 2.16 | 2.34 | 7.88 | 9.80 | 0.07 | 0.03 |
| $R_2O + RO$ | 16.47 | 16.45 | 17.05 | 21.79 | 21.63 | 12.95 | 14.61 |
| $Al_2O_3 - R_2O - RO$ | 17.04 | 17.23 | 17.36 | 2.16 | 2.34 | 15.72 | 14.55 |
| $Al_2O_3 + B_2O_3 - R_2O - RO$ | 30.60 | 31.41 | 31.10 | 6.09 | 6.26 | 29.36 | 34.15 |
| Density (g/cm³) | — | — | — | — | — | — | — |
| CTE at 300° C. cooling (ppm) | — | — | — | — | — | — | — |
| CTE at 50° C. cooling (ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | 94.8 | 102.7 | 107.8 | 92.12 | 93.84 | 86.61 | 82.61 |
| Shear modulus (GPa) | 38.3 | 41.6 | 42.6 | 37.07 | 37.69 | 34.59 | 32.87 |
| Poisson's ratio | 0.239 | 0.233 | 0.266 | 0.24 | 0.24 | 0.25 | 0.26 |
| Refractive index | — | — | — | — | — | — | — |
| SOC (nm/mm/MPa) | — | — | — | — | — | — | — |
| VFT A | — | — | — | — | — | — | — |
| VFT B | — | — | — | — | — | — | — |
| VFT To | — | — | — | — | — | — | — |
| Liquidus (gradient boat) duration (hours) | — | — | — | — | — | — | — |
| Air interface liquidus temperature | — | — | — | — | — | — | — |

TABLE 1-continued

| | | | | | | | |
|---|---|---|---|---|---|---|---|
| Internal liquidus temperature | — | — | — | — | — | — | — |
| Platinum interface liquidus temperature | — | — | — | — | — | — | — |
| Primary Phase | — | — | — | — | — | — | — |
| Liquidus Viscosity (kP) | — | — | — | — | — | — | — |
| $K_{Ic}$ (CN) (MPa·m$^{1/2}$) | 1.397 | — | 1.222 | — | — | — | — |
| Standard Deviation (CN) | 0.223 | — | 0.115 | — | — | — | — |
| $K_{Ic}$/Young's Modulus (m$^{1/2}$) | 0.0147 | — | 0.0113 | — | — | — | — |

| Example | 43 | 44 | 45 | 46 | 47 | 48 | 49 |
|---|---|---|---|---|---|---|---|
| $SiO_2$ | 48.61 | 38.12 | 46.61 | 40.00 | 40.00 | 40.00 | 40.00 |
| $Al_2O_3$ | 24.81 | 27.89 | 26.76 | 28.00 | 28.00 | 28.00 | 28.00 |
| $B_2O_3$ | 13.54 | 19.32 | 13.69 | 4.00 | 4.00 | 4.00 | 4.00 |
| $Li_2O$ | 10.92 | 14.60 | 10.83 | 17.00 | 16.00 | 15.00 | 14.00 |
| $Na_2O$ | 1.93 | 0.01 | 1.92 | 1.00 | 1.00 | 1.00 | 1.00 |
| $K_2O$ | 0.03 | 0 | 0.03 | 0.30 | 0.30 | 0.30 | 0.30 |
| MgO | 0.03 | 0.03 | 0.04 | 10.00 | 11.00 | 12.00 | 13.00 |
| CaO | 0.03 | 0 | 0.04 | 0 | 0 | 0 | 0 |
| $SnO_2$ | 0.06 | 0 | 0.06 | 0.05 | 0.05 | 0.05 | 0.05 |
| $Fe_2O_3$ | 0 | 0 | 0 | 0 | 0 | 0 | 0 |
| $Al_2O_3 + B_2O_3$ | 38.35 | 47.21 | 40.45 | 32.00 | 32.00 | 32.00 | 32.00 |
| $R_2O$ | 12.88 | 14.61 | 12.78 | 18.30 | 17.30 | 16.30 | 15.30 |
| RO | 0.06 | 0.03 | 0.08 | 10.00 | 11.00 | 12.00 | 13.00 |
| $R_2O$ + RO | 12.94 | 14.64 | 12.86 | 28.30 | 28.30 | 28.30 | 28.30 |
| $Al_2O_3 - R_2O - RO$ | 11.87 | 13.25 | 13.90 | −0.30 | −0.30 | −0.30 | −0.30 |
| $Al_2O_3 + B_2O_3 - R_2O - RO$ | 25.41 | 32.57 | 27.59 | 3.70 | 3.70 | 3.70 | 3.70 |
| Density (g/cm$^3$) | — | — | — | — | — | — | — |
| CTE at 300° C. cooling (ppm) | — | — | — | — | — | — | — |
| CTE at 50° C. cooling (ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | 82.13 | 81.37 | 84.75 | — | — | — | — |
| Shear modulus (GPa) | 32.66 | 32.18 | 33.49 | — | — | — | — |
| Poisson's ratio | 0.26 | 0.26 | 0.27 | — | — | — | — |
| Refractive index | — | — | — | — | — | — | — |
| SOC (nm/mm/MPa) | — | — | — | — | — | — | — |
| VFT A | — | — | — | — | — | — | — |
| VFT B | — | — | — | — | — | — | — |
| VFT To | — | — | — | — | — | — | — |
| Liquidus (gradient boat) duration (hours) | — | — | — | — | — | — | — |
| Air interface liquidus temperature | — | — | — | — | — | — | — |
| Internal liquidus temperature | — | — | — | — | — | — | — |
| Platinum interface liquidus temperature | — | — | — | — | — | — | — |
| Primary Phase | — | — | — | — | — | — | — |
| Liquidus Viscosity (kP) | — | — | — | — | — | — | — |
| $K_{Ic}$ (CN) (MPa·m$^{1/2}$) | — | — | — | — | — | — | — |
| Standard Deviation (CN) | — | — | — | — | — | — | — |
| $K_{Ic}$/Young's Modulus (m$^{1/2}$) | — | — | — | — | — | — | — |

| Example | 50 | 51 | 52 | 53 | 54 | 55 | 56 |
|---|---|---|---|---|---|---|---|
| $SiO_2$ | 40.00 | 40.00 | 43.43 | 40.76 | 44.58 | 42.71 | 39.89 |
| $Al_2O_3$ | 28.00 | 28.00 | 27.72 | 28.10 | 26.15 | 26.05 | 25.90 |
| $B_2O_3$ | 4.00 | 4.00 | 13.36 | 13.50 | 13.55 | 13.57 | 12.99 |
| $Li_2O$ | 13.00 | 12.00 | 3.97 | 4.03 | 4.01 | 4.06 | 3.91 |
| $Na_2O$ | 1.00 | 1.00 | 8.97 | 9.01 | 9.11 | 9.06 | 8.76 |
| $K_2O$ | 0.30 | 0.30 | 0.42 | 0.43 | 0.44 | 0.44 | 0.39 |
| MgO | 14.00 | 15.00 | 2.02 | 4.06 | 2.06 | 4.00 | 8.03 |
| CaO | 0 | 0 | 0 | 0 | 0 | 0 | 0 |
| $SnO_2$ | 0.05 | 0.05 | 0 | 0 | 0 | 0 | 0 |
| $Fe_2O_3$ | 0 | 0 | 0 | 0 | 0 | 0 | 0 |
| $Al_2O_3 + B_2O_3$ | 32.00 | 32.00 | 41.08 | 41.60 | 39.70 | 39.62 | 38.89 |

TABLE 1-continued

| | | | | | | | |
|---|---|---|---|---|---|---|---|
| R₂O | 14.30 | 13.30 | 13.36 | 13.47 | 13.56 | 13.56 | 13.06 |
| RO | 14.00 | 15.00 | 2.02 | 4.06 | 2.06 | 4.00 | 8.03 |
| R₂O + RO | 28.30 | 28.30 | 15.38 | 17.53 | 15.62 | 17.56 | 21.09 |
| Al₂O₃ − R₂O − RO | −0.30 | −0.30 | 12.34 | 10.57 | 10.53 | 8.49 | 4.81 |
| Al₂O₃ + B₂O₃ − R₂O − RO | 3.70 | 3.70 | 25.70 | 24.07 | 24.08 | 22.06 | 17.80 |
| Density (g/cm³) | — | — | — | — | — | — | — |
| CTE at 300° C. cooling (ppm) | — | — | — | — | — | — | — |
| CTE at 50° C. cooling (ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | — | — | 80.33 | 81.29 | 77.78 | 79.02 | 81.71 |
| Shear modulus (GPa) | — | — | 32.13 | 32.48 | 31.30 | 31.65 | 32.54 |
| Poisson's ratio | — | — | 0.25 | 0.25 | 0.24 | 0.25 | 0.26 |
| Refractive index | — | — | — | — | — | — | — |
| SOC (nm/mm/MPa) | — | — | — | — | — | — | — |
| VFT A | — | — | — | — | — | — | — |
| VFT B | — | — | — | — | — | — | — |
| VFT To | — | — | — | — | — | — | — |
| Liquidus (gradient boat) duration (hours) | — | — | — | — | — | — | — |
| Air interface liquidus temperature | — | — | — | — | — | — | — |
| Internal liquidus temperature | — | — | — | — | — | — | — |
| Platinum interface liquidus temperature | — | — | — | — | — | — | — |
| Primary Phase | — | — | — | — | — | — | — |
| Liquidus Viscosity (kP) | — | — | — | — | — | — | — |
| $K_{Ic}$ (CN) (MPa · m$^{1/2}$) | — | — | — | — | — | — | — |
| Standard Deviation (CN) | — | — | — | — | — | — | — |
| $K_{Ic}$/Young's Modulus (m$^{1/2}$) | — | — | — | — | — | — | — |

| Example | 57 | 58 | 59 | 60 | 61 | 62 | 63 |
|---|---|---|---|---|---|---|---|
| SiO₂ | 42.54 | 40.72 | 44.62 | 42.62 | 38.72 | 40.83 | 38.78 |
| Al₂O₃ | 27.98 | 28.05 | 26.10 | 26.14 | 26.15 | 29.76 | 31.62 |
| B₂O₃ | 13.69 | 13.40 | 13.44 | 13.37 | 13.37 | 13.59 | 13.69 |
| Li₂O | 9.24 | 9.28 | 9.28 | 9.32 | 9.23 | 9.19 | 9.25 |
| Na₂O | 3.97 | 3.95 | 3.98 | 3.94 | 3.91 | 4.03 | 4.03 |
| K₂O | 0.44 | 0.44 | 0.44 | 0.43 | 0.42 | 0.46 | 0.46 |
| MgO | 2.03 | 4.04 | 2.04 | 4.07 | 8.06 | 2.05 | 2.06 |
| CaO | 0 | 0 | 0 | 0 | 0 | 0 | 0 |
| SnO₂ | 0 | 0 | 0 | 0 | 0 | 0 | 0 |
| Fe₂O₃ | 0 | 0 | 0 | 0 | 0 | 0 | 0 |
| Al₂O₃ + B₂O₃ | 41.67 | 41.45 | 39.54 | 39.51 | 39.52 | 43.35 | 45.31 |
| R₂O | 13.65 | 13.67 | 13.70 | 13.69 | 13.56 | 13.68 | 13.74 |
| RO | 2.03 | 4.04 | 2.04 | 4.07 | 8.06 | 2.05 | 2.06 |
| R₂O + RO | 15.68 | 17.71 | 15.74 | 17.76 | 21.62 | 15.73 | 15.80 |
| Al₂O₃ − R₂O − RO | 12.30 | 10.34 | 10.36 | 8.38 | 4.53 | 14.03 | 15.82 |
| Al₂O₃ + B₂O₃ − R₂O − RO | 25.99 | 23.74 | 23.80 | 21.75 | 17.90 | 27.62 | 29.51 |
| Density (g/cm³) | — | — | — | — | — | — | — |
| CTE at 300° C. cooling (ppm) | — | — | — | — | — | — | — |
| CTE at 50° C. cooling (ppm) | — | — | — | — | — | — | — |
| Strain Pt. (° C.) | — | — | — | — | — | — | — |
| Anneal Pt. (° C.) | — | — | — | — | — | — | — |
| Softening Pt. (° C.) | — | — | — | — | — | — | — |
| Young's Modulus (GPa) | 84.67 | 85.84 | 82.26 | 83.64 | 85.98 | — | — |
| Shear modulus (GPa) | 33.79 | 34.20 | 32.96 | 33.30 | 34.34 | — | — |
| Poisson's ratio | 0.25 | 0.25 | 0.25 | 0.26 | 0.25 | — | — |
| Refractive index | — | — | — | — | — | — | — |
| SOC (nm/mm/MPa) | — | — | — | — | — | — | — |
| VFT A | — | — | — | — | — | — | — |
| VFT B | — | — | — | — | — | — | — |
| VFT To | — | — | — | — | — | — | — |
| Liquidus (gradient boat) duration (hours) | — | — | — | — | — | — | — |

TABLE 1-continued

| | | | | |
|---|---|---|---|---|
| Air interface liquidus temperature | — | — | — | — |
| Internal liquidus temperature | — | — | — | — |
| Platinum interface liquidus temperature | — | — | — | — |
| Primary Phase | — | — | — | — |
| Liquidus Viscosity (kP) | — | — | — | — |
| $K_{Ic}$ (CN) (MPa·m$^{1/2}$) | — | — | — | — |
| Standard Deviation (CN) | — | — | — | — |
| $K_{Ic}$/Young's Modulus (m$^{1/2}$) | — | — | — | — |

| Example | 64 | 65 | 66 | 67 |
|---|---|---|---|---|
| SiO$_2$ | 37.33 | 36.40 | 35.62 | 34.74 |
| Al$_2$O$_3$ | 33.06 | 33.51 | 33.68 | 34.41 |
| B$_2$O$_3$ | 13.43 | 13.56 | 14.18 | 13.74 |
| Li$_2$O | 9.44 | 9.65 | 9.91 | 10.04 |
| Na$_2$O | 4.09 | 4.17 | 3.93 | 4.24 |
| K$_2$O | 0.47 | 0.47 | 0.45 | 0.43 |
| MgO | 2.07 | 2.13 | 2.09 | 2.28 |
| CaO | 0 | 0 | 0 | 0 |
| SnO$_2$ | 0 | 0 | 0 | 0 |
| Fe$_2$O$_3$ | 0 | 0 | 0 | 0 |
| Al$_2$O$_3$ + B$_2$O$_3$ | 46.49 | 47.07 | 47.86 | 48.15 |
| R$_2$O | 14.00 | 14.29 | 14.29 | 14.71 |
| RO | 2.07 | 2.13 | 2.09 | 2.28 |
| R$_2$O + RO | 16.07 | 16.42 | 16.38 | 16.99 |
| Al$_2$O$_3$ − R$_2$O − RO | 16.99 | 17.09 | 17.30 | 17.42 |
| Al$_2$O$_3$ + B$_2$O$_3$ − R$_2$O − RO | 30.42 | 30.65 | 31.48 | 31.16 |
| Density (g/cm$^3$) | — | — | — | — |
| CTE at 300° C. cooling (ppm) | — | — | — | — |
| CTE at 50° C. cooling (ppm) | — | — | — | — |
| Strain Pt. (° C.) | — | — | — | — |
| Anneal Pt. (° C.) | — | — | — | — |
| Softening Pt. (° C.) | — | — | — | — |
| Young's Modulus (GPa) | — | — | — | — |
| Shear modulus (GPa) | — | — | — | — |
| Poisson's ratio | — | — | — | — |
| Refractive index | — | — | — | — |
| SOC (nm/mm/MPa) | — | — | — | — |
| VFT A | — | — | — | — |
| VFT B | — | — | — | — |
| VFT To | — | — | — | — |
| Liquidus (gradient boat) duration (hours) | — | — | — | — |
| Air interface liquidus temperature | — | — | — | — |
| Internal liquidus temperature | — | — | — | — |
| Platinum interface liquidus temperature | — | — | — | — |
| Primary Phase | — | — | — | — |
| Liquidus Viscosity (kP) | — | — | — | — |
| $K_{Ic}$ (CN) (MPa·m$^{1/2}$) | — | — | — | — |
| Standard Deviation (CN) | — | — | — | — |
| $K_{Ic}$/Young's Modulus (m$^{1/2}$) | — | — | — | — |

As indicated by the example glass compositions in Table 1, glass compositions as described herein have increased $K_{Ic}$ fracture toughness such that the glass compositions are more resistant to damage. Moreover, glass compositions as described herein have a relatively high ratio of $K_{Ic}$ fracture toughness to Young's modulus and a relatively high Poisson's ratio, which both increase the fracture energy such that the glass compositions are more resistant to damage.

Figure 2:
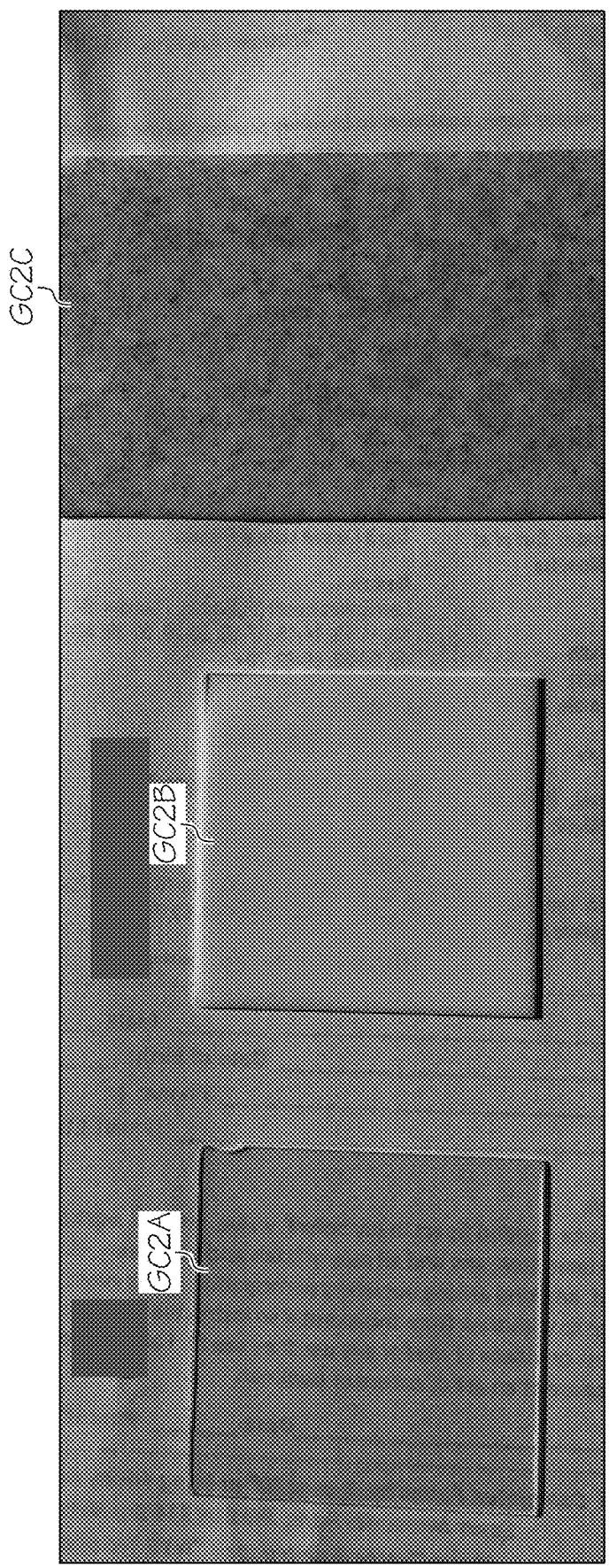
FIG. 2 is a photograph of glass articles made from an exemplary glass composition and subjected to a cooling schedule according to one or more embodiments described herein.

Referring now to FIG. 2, cooling example glass composition 2 from a melt at 1650° C. in air at room temperature (i.e., 20° C.) for 3 minutes and then in an oven at 500° C. results in a transparent glass article GC2A. Cooling example glass composition 2 from a melt at 1650° C. in air at room temperature for 2 minutes and then in an oven at 500° C. results in an opaque, white glass-ceramic article GC2B. Cooling example glass composition 2 from a melt at 1650°

C. in air at room temperature for 1 minute and then in an oven at 500° C. results in an opaque, patterned glass-ceramic GC2C. As indicated by the glass articles shown in FIG. 2, the glass compositions described herein may be subjected to different cooling schedules to produce a transparent glass article; an opaque, white glass-ceramic article; and an opaque, patterned glass-ceramic article.

Figure 3:
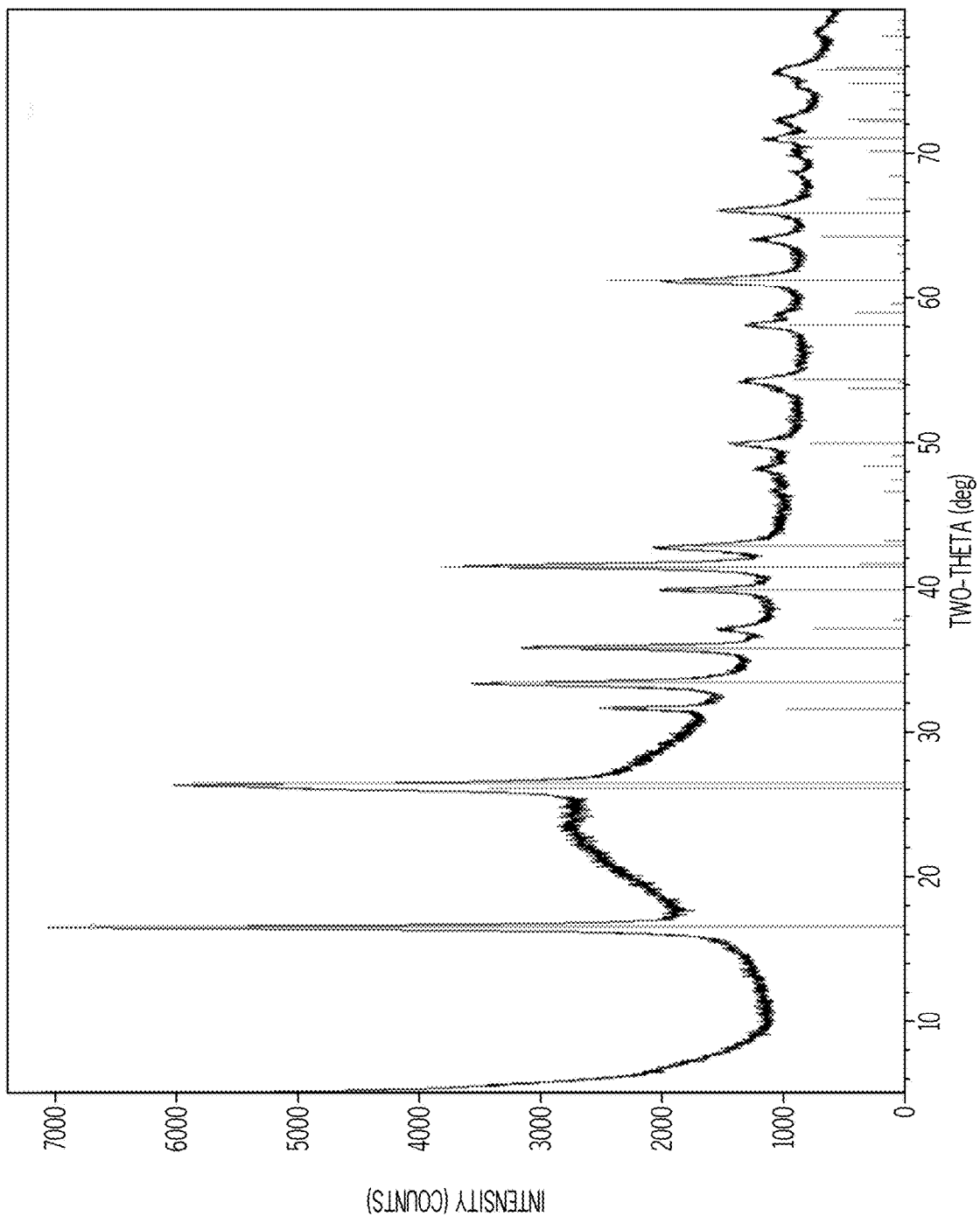
FIG. 3 is plot of an X-ray diffraction ("XRD") spectrum (x-axis: Two-Theta; y-axis: Intensity) of a sample glass article made from a glass composition and subjected to a cooling schedule according to one or more embodiments described herein.
Figure 4:
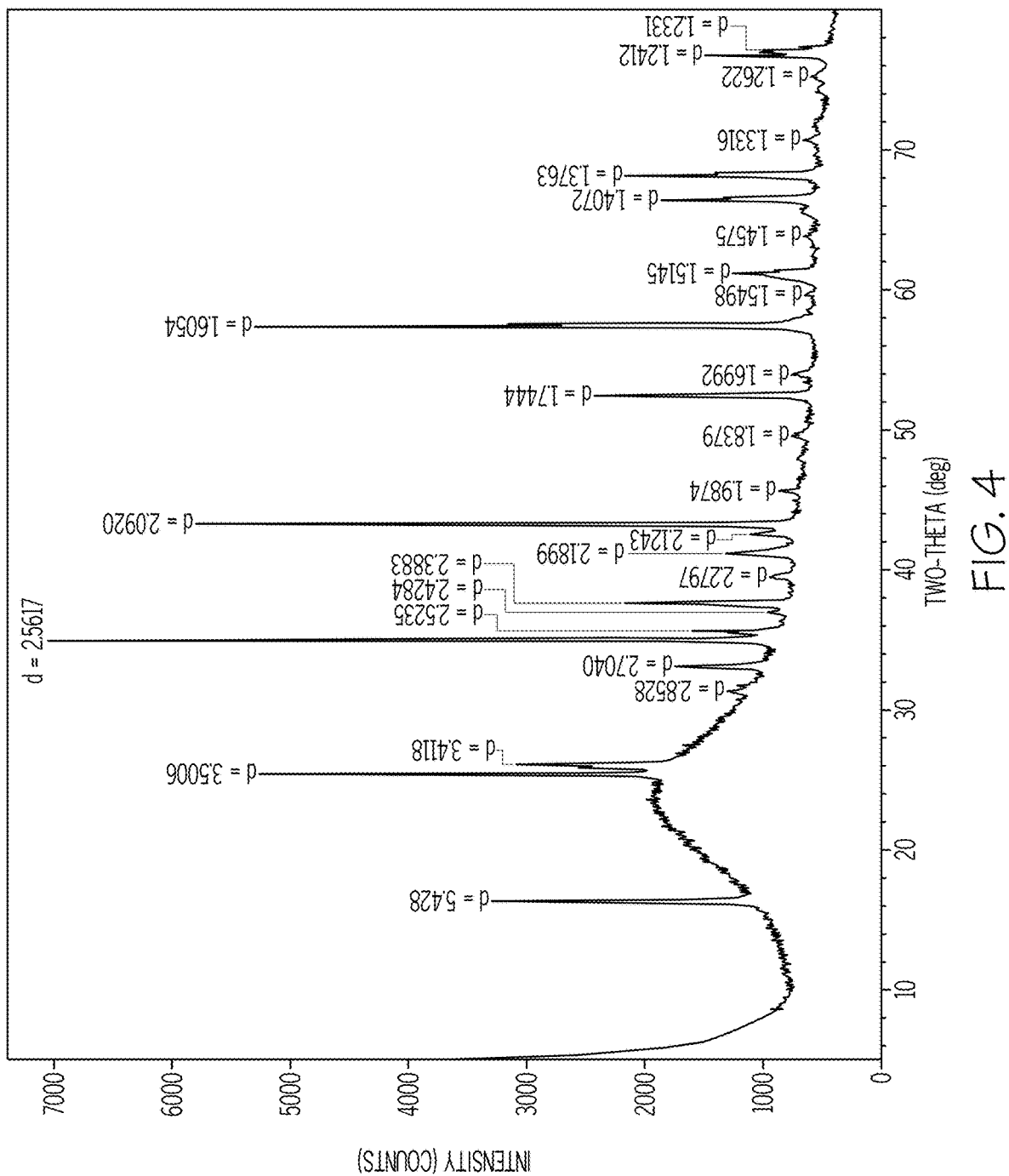
FIG. 4 is a plot of an XRD spectrum (x-axis: Two-Theta; y-axis: Intensity) of a glass article made from a sample glass composition and subjected to a cooling schedule according to one or more embodiments described herein.

Referring now to Table 2, XRD data shows cooling example glass compositions 33-38 at from a melt at 1650° C. in air at room temperature (i.e., 20° C.) for 2 minutes and then in an oven at 500° C. (hereinafter "example cooling schedule") results in glass-ceramic articles having a boromullite crystalline phase and/or a corundum crystalline phase. Referring now to FIG. 3, the XRD spectrum for example glass composition 33 after being subjected to the example cooling schedule includes peaks evidencing the presence of a boromullite crystalline phase. Referring now to FIG. 4, the XRD spectrum for example glass composition 37 after being subjected to the example cooling schedule includes peaks evidencing the presence of a boromullite crystalline phase and a corundum crystalline phase. The boromullite and corundum crystalline phases are non-alkali containing. As indicated by Table 2 and FIGS. 3 and 4, the glass compositions described herein may be cooled to form glass-ceramics having one or more non-alkali containing crystalline phases such that the alkali present in the glass composition may be left in the residual glass after crystallization to be ion exchanged.

TABLE 2

| Example | 33 | 34 | 35 | 36 | 37 | 38 |
|---|---|---|---|---|---|---|
| Boromullite (wt %) | 24 | 26 | 28 | 23 | 7.1 | 28 |
| Corundum (wt %) | — | — | — | — | 16 | 0.4 |

Figure 5:
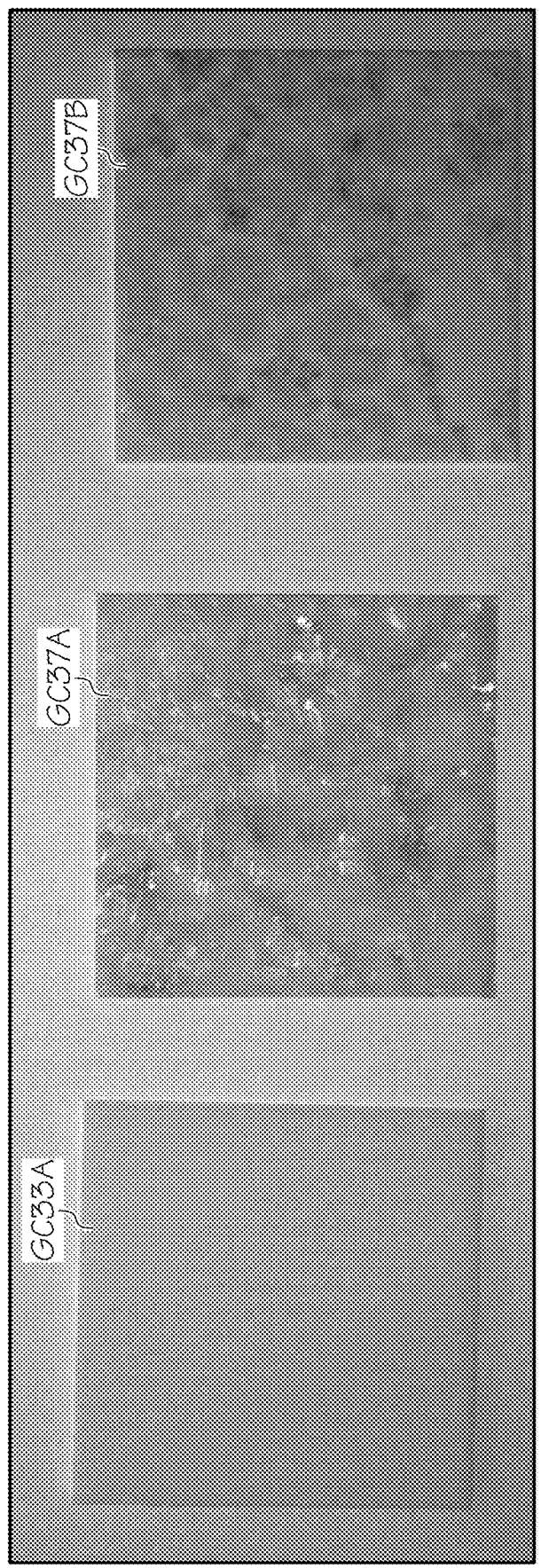
FIG. 5 is a photograph of glass articles made from exemplary glass compositions and subjected to a cooling schedule according to one or more embodiments described herein.

Referring now to FIG. 5, subjecting example glass composition 33 to the example cooling schedule results in an opaque, white glass-ceramic article GC33A. The white color of GC33A is confirmed by the CIELAB color space of GC33A as shown in Table 3. As indicated by GC33A, the presence of a boromullite crystalline phase, as evidenced by the XRD spectrum shown in FIG. 3, results in an opaque, white glass-ceramic article.

TABLE 3

| Color Coordinates | GC33A, Total Rx | GC33A, Diffuse Rx |
|---|---|---|
| L* | 90.13 | 87.92 |
| a* | −0.46 | −0.48 |
| b* | 0.46 | 0.57 |

Referring back to FIG. 5, subjecting example glass composition 37 to the example cooling schedule results in opaque, patterned glass-ceramic articles GC37A and GC37B. As indicated by GC37A and GC37B, the presence of a corundum crystalline phase, as evidenced by the XRD spectrum shown in FIG. 4, results in an opaque, patterned glass-ceramic article.

Figure 6:
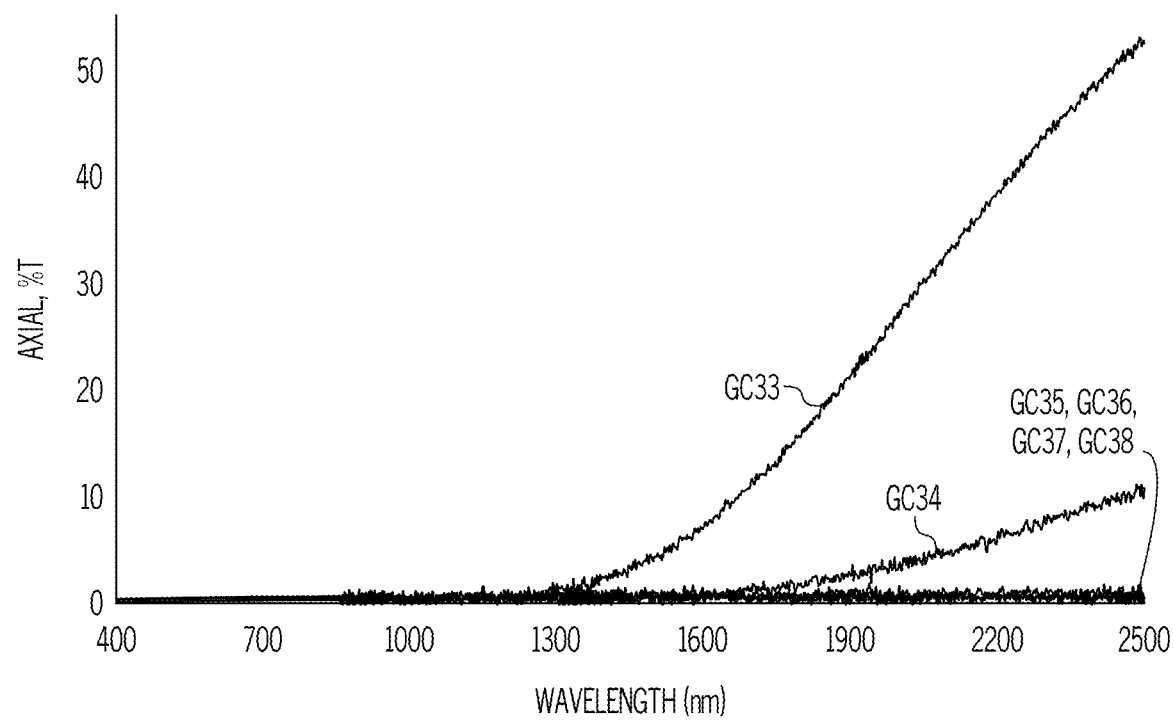
FIG. 6 is a plot of transmittance percentage (y-axis) verses wavelength (x-axis) of glass articles made from glass compositions and subjected to a cooling schedule according to one or more embodiments described herein.
Figure 7:
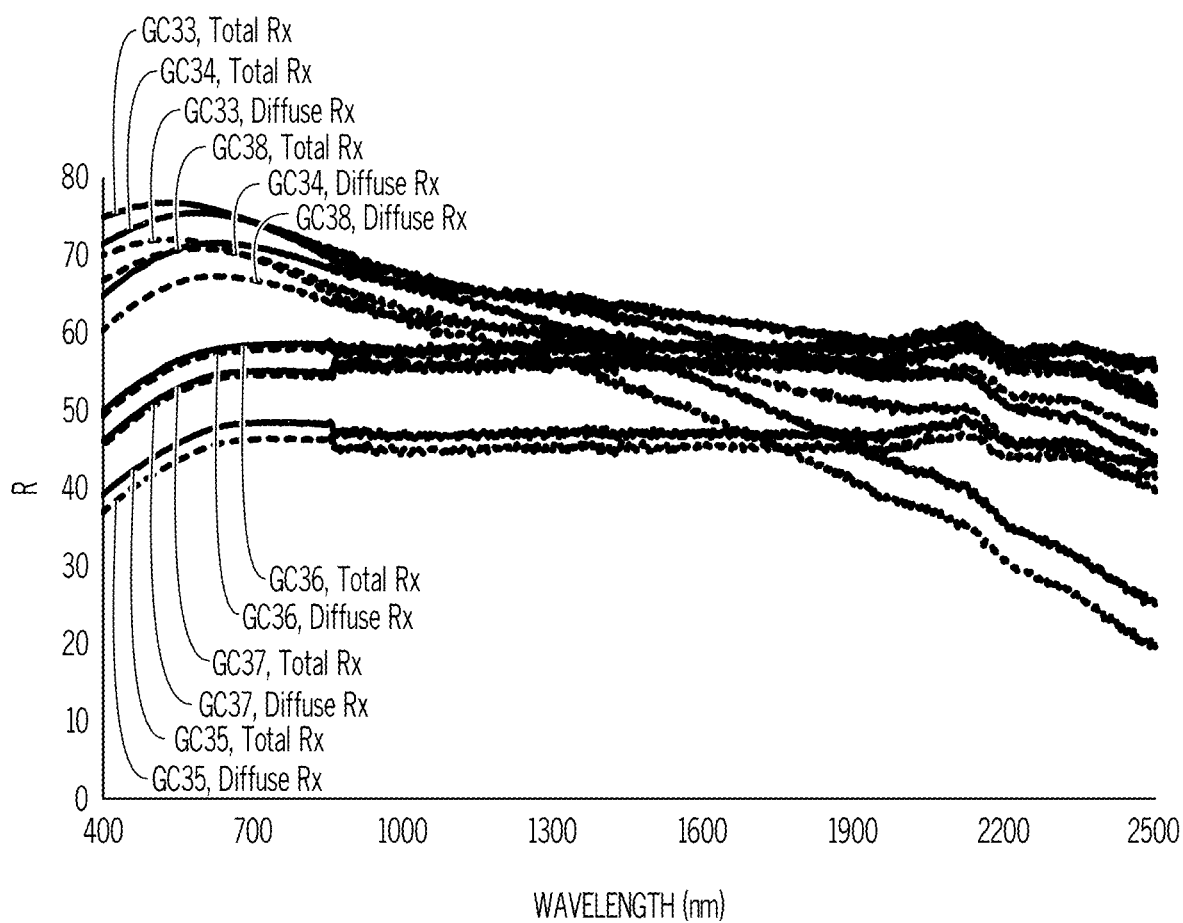
FIG. 7 is a plot of reflectance percentage (y-axis) versus wavelength (x-axis) of glass articles made from glass compositions and subjected to a cooling schedule according to one or more embodiments described herein.

Referring now to FIG. 6, subjecting glass compositions 33-38 to the example cooling schedule results in glass-ceramic articles that have 0% average transmission (i.e., in the visible wavelength range) and transmit in the IR wavelength range (i.e., 800-2500 nm), indicating that the resulting glass-ceramic articles are opaque glass-ceramic articles. Referring now to FIG. 7, subjecting glass compositions 33-38 to the example cooling schedule results in glass-ceramic articles that have a peak reflectance between 400 nm and 700 nm, indicating that the resulting glass-ceramic articles are white.

As indicated by Table 3 and FIGS. 5-7, the glass compositions described herein may be subjected to a cooling schedule to form opaque, white glass-ceramic articles.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass composition comprising:
    greater than or equal to 24 mol % and less than or equal to 60 mol % $SiO_2$;
    greater than or equal to 23 mol % and less than or equal to 35 mol % $Al_2O_3$;
    greater than or equal to 3.5 mol % and less than or equal to 35 mol % $B_2O_3$;
    greater than 0 mol % and less than 19.99 mol % $Li_2O$;
    greater than 0 mol % and less than or equal to 10 mol % $Na_2O$; and
    greater than 0.01 mol % and less than or equal to 3 mol % $K_2O$, wherein
    $R_2O$ is greater than or equal to 12 mol % and less than or equal to 20 mol %, $R_2O$ being the sum of $Li_2O$, $Na_2O$, and $K_2O$.

2. The glass composition of claim 1, wherein $Al_2O_3 + B_2O_3$ is greater than or equal to 28 mol % and less than or equal to 60 mol %.

3. The glass composition of claim 1, wherein the glass composition comprises greater than or equal to 24 mol % and less than or equal to 34 mol % $Al_2O_3$.

4. The glass composition of claim 1, wherein the glass composition comprises greater than or equal to 5 mol % and less than or equal to 30 mol % $B_2O_3$.

5. The glass composition of claim 1, wherein $Al_2O_3 - R_2O - RO$ is greater than or equal to −0.5 mol %.

6. The glass composition of claim 1, wherein the glass composition comprises greater than or equal to 3 mol % and less than or equal to 18 mol % $Li_2O$.

7. The glass composition of claim 6, wherein the glass composition comprises greater than or equal to 3 mol % and less than or equal to 11 mol % $Li_2O$.

8. The glass composition of claim 6, wherein the glass composition comprises greater than or equal to 10 mol % and less than or equal to 18 mol % $Li_2O$.

9. The glass composition of claim 6, wherein the glass composition comprises:
    greater than or equal to 25 mol % and less than or equal to 35 mol % $Al_2O_3$; and
    greater than or equal to 3 mol % and less than or equal to 11 mol % $Li_2O$.

10. The glass composition of claim 6, wherein the glass composition comprises:
    greater than or equal to 24 mol % and less than or equal to 30 mol % $Al_2O_3$; and
    greater than or equal to 10 mol % and less than or equal to 18 mol % $Li_2O$.

11. The glass composition of claim 1, wherein $R_2O$ is greater than or equal to 12.5 mol % and less than or equal to 19 mol %.

12. The glass composition of claim 1, wherein RO is greater than or equal to 0 mol % and less than or equal to 17.5 mol %, RO being the sum of MgO, CaO, SrO, BaO, and ZnO.

13. The glass composition of claim 12, wherein RO is greater than 0 mol % and less than or equal to 15 mol %.

14. The glass composition of claim 1, wherein the glass composition comprises greater than or equal to 0 mol % and less than or equal to 15 mol % MgO.

15. The glass composition of claim 1, wherein $Al_2O_3 + B_2O_3 - R_2O - RO$ is greater than 2 mol %.

16. The glass composition of claim 1, wherein the glass composition has a $K_{Ic}$ fracture toughness as measured by a chevron notch short bar method greater than or equal to 0.75 $MPa \cdot m^{1/2}$.

17. The glass composition of claim 1, wherein the glass composition has a Young's modulus greater than or equal to 70 MPa.

18. The glass composition of claim 1, wherein a ratio of $K_{Ic}$ fracture toughness to Young's modulus of the glass composition is greater than or equal to 0.0095 $m^{1/2}$.

19. The glass composition claim 18, wherein the ratio of $K_{Ic}$ fracture toughness to Young's modulus of the glass composition is greater than or equal to 0.01 $m^{1/2}$.

20. The glass composition of claim 1, wherein the glass composition has a Poisson's ratio greater than or equal to 0.21.

\* \* \* \* \*